United States Patent
Kagawa et al.

(10) Patent No.: US 7,630,640 B2
(45) Date of Patent: Dec. 8, 2009

(54) BIDIRECTIONAL TIME DIVISION MULTIPLEXING OPTICAL COMMUNICATION SYSTEM

(75) Inventors: Masatoshi Kagawa, Tokyo (JP); Hiromi Tsuji, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 597 days.

(21) Appl. No.: 11/433,454

(22) Filed: May 15, 2006

(65) Prior Publication Data

US 2006/0269291 A1 Nov. 30, 2006

(30) Foreign Application Priority Data

May 16, 2005 (JP) ............................. 2005-142994

(51) Int. Cl.
*H04J 14/00* (2006.01)
*H04J 14/08* (2006.01)

(52) U.S. Cl. .............................. 398/72; 398/75; 398/99; 398/100

(58) Field of Classification Search .................. 398/67, 398/68, 72, 75, 155, 98–102
See application file for complete search history.

(56) References Cited

U.S. PATENT DOCUMENTS 6,775,478 B2 * 8/2004 Suzuki et al. ................. 398/75
2006/0140642 A1 * 6/2006 Brolin ......................... 398/183

FOREIGN PATENT DOCUMENTS

JP 11-298430 10/1999
JP 2004-222255 8/2004

* cited by examiner

*Primary Examiner*—Nathan M Curs
(74) *Attorney, Agent, or Firm*—Venable LLP; James R. Burdett

(57) ABSTRACT

An optical communication system which constructs, at low cost, a network that uses Time Division Multiplexing in at least one direction of the communication. The optical communication system includes an optical multiplexer/demultiplexer that mediates communication between a network unit and a plurality of terminal units. The optical multiplexer/demultiplexer regenerates a synchronization clock from a downstream signal light. In addition, the optical multiplexer/demultiplexer adjusts, using the regenerated synchronization clock, the delay times of a plurality of upstream signal lights received from the terminal units. The network unit and the terminal units do not need to control the timing of the upstream signal lights. Thus, the construction costs of the optical communication system are reduced.

18 Claims, 18 Drawing Sheets

FIG. 7
(A) 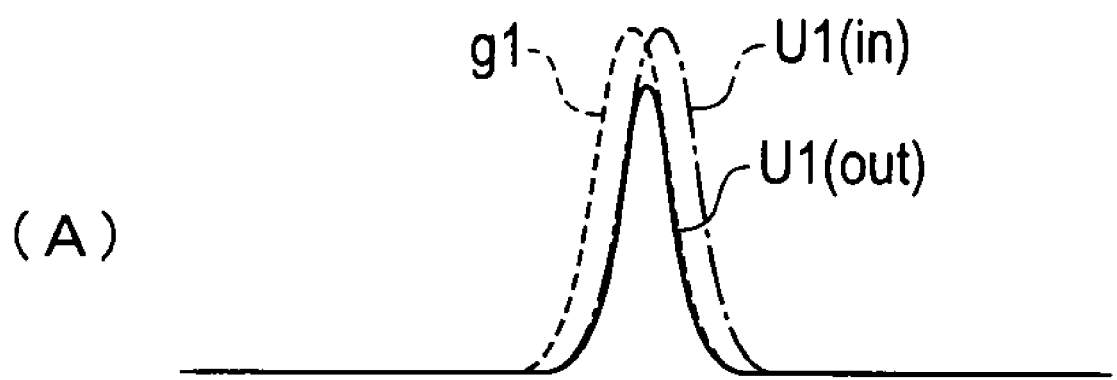
(B) 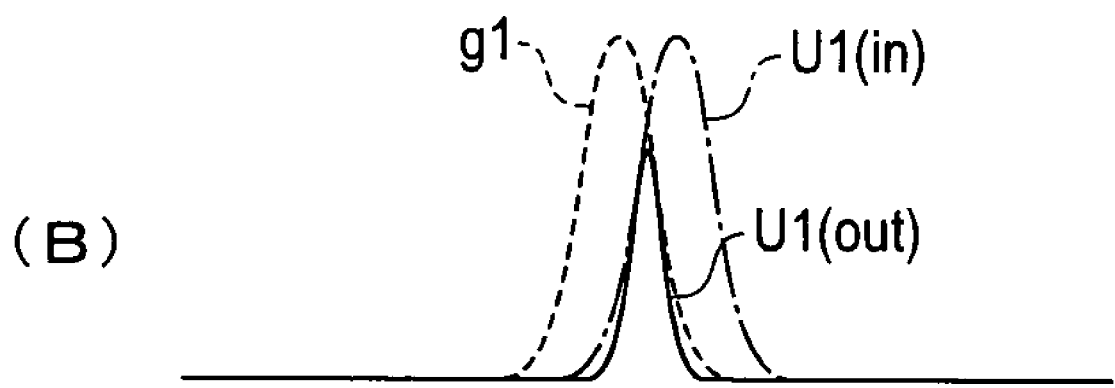

a: Optical Path Length   12 pico second
b: Optical Path Length   11 pico second
c: Optical Path Length   10 pico second
d: Optical Path Length    9 pico second
e: Optical Path Length    8 pico second

BIDIRECTIONAL TIME DIVISION MULTIPLEXING OPTICAL COMMUNICATION SYSTEM

BACKGROUND OF THE INVENTION

1. Field of the Invention

The present invention relates to an optical communication system which uses time division multiplexing in upstream communication. The present invention can be applied to an optical communication system for providing a subscriber with services such as FTTH (Fiber To The Home).

2. Description of Related Art

As conventional optical communication systems, there is a known system in which an upstream signal carrier (i.e., a carrier used to send a signal from a terminal unit to a network unit) is generated by the network unit side and the upstream signal carrier is supplied to the terminal unit. Such an optical communication system is disclosed in, for example, paragraphs 0002 to 0008 and FIG. 14 of Japanese Patent Application Laid-Open No. 2004-222255. Japanese Patent Application Laid-Open No. 2004-222255 discloses that, in a Wavelength Division Multiplexing (WDM) optical communication system, a downstream signal light and an upstream optical carrier are wavelength-multiplexed and the wavelength-multiplexed light is sent to a terminal unit ("ONUs 70-1 to 70-n" in the document) from a network unit ("OSU 50" in the document). The terminal unit demultiplexes the upstream signal optical carrier from the received wavelength-multiplexed light and uses the upstream signal optical carrier to generate an upstream signal light. According to the optical communication system of Japanese Patent Application Laid-Open No. 2004-222255, a light source used to generate an upstream signal carrier does not need to be provided to individual terminal units and a light source provided in the network unit can be shared between the terminal units. By thus sharing the light source, the costs of terminal units can be reduced; consequently, the construction costs of the entire system can be reduced.

In addition, as conventional optical communication systems, there is a known system that uses Time Division Multiplexing (TDM) in upstream communication. Such an optical communication system is disclosed in, for example, paragraph 0003 and FIG. 7 of Japanese Patent Application Laid-Open No. 11-298430. In the case of using Time Division Multiplexing in upstream communication, timing needs to be controlled so that signals sent from different terminal units (subscriber optical terminals 15 in the document) do not collide with each other. Hence, in the system of Japanese Patent Application Laid-Open No. 11-298430, a control signal for controlling upstream transmission timing is sent to the terminal units from a network unit (station side device 14 in the document). In the optical communication system, the distance from the network unit to the terminal units varies from terminal unit to terminal unit. Therefore, in order to prevent a collision between upstream signals, the transmission timing for each terminal unit needs to be controlled taking into account the difference in distance.

As described above, the system of Japanese Patent Application Laid-Open No. 2004-222255, since Wavelength Division Multiplexing is used in upstream communication, multiple types of wavelengths need to be used; as a result, the system construction costs are still expensive. Hence, when a large band is not required, it is desirable to use Time Division multiplexing in upstream communication.

However, as described above, in an optical communication system that uses Time Division Multiplexing in upstream communication, the transmission timing needs to be controlled, taking into account the difference in distance from the network unit to each terminal unit (see Japanese Patent Application Laid-Open No. 11-298430). Such timing control makes the processes performed by the network unit and the terminal units complicated, and accordingly, the system costs cannot be sufficiently reduced.

SUMMARY OF THE INVENTION

An object of the present invention is to reduce the system construction costs of an optical communication system that uses Time Division Multiplexing in upstream communication.

An optical communication system according to the present invention includes: a network unit that generates a downstream light wave including a downstream signal light of a first wavelength, and demultiplexes a time-division multiplexed upstream light wave; a plurality of terminal units which generate an upstream signal light of a second wavelength; and an optical multiplexer/demultiplexer that branches the downstream signal light received from the network unit and sends the branched downstream signal lights to the terminal units, and regenerates a synchronization clock from the downstream light wave and time-division multiplexes, using the synchronization clock, the upstream signal lights received from the terminal units.

According to the present invention, the optical multiplexer/demultiplexer can time-division multiplex upstream signal lights using a synchronization clock regenerated from a downstream light wave. Therefore, in the optical communication system of the present invention, the network unit and the terminal units do not need to control the timing of upstream signal lights, making it possible to reduce the construction costs of the optical communication system.

BRIEF DESCRIPTION OF THE DRAWINGS

Other objects and advantages of the present invention will be described with reference to the following accompanying drawings.

FIG. 7A is a conceptual signal waveform diagram for describing upstream communication in the optical communication system according to the first embodiment;

FIG. 7B is a conceptual signal waveform diagram for describing upstream communication in the optical communication system according to the first embodiment;

DESCRIPTION OF THE PREFERRED EMBODIMENTS

Figure 1:
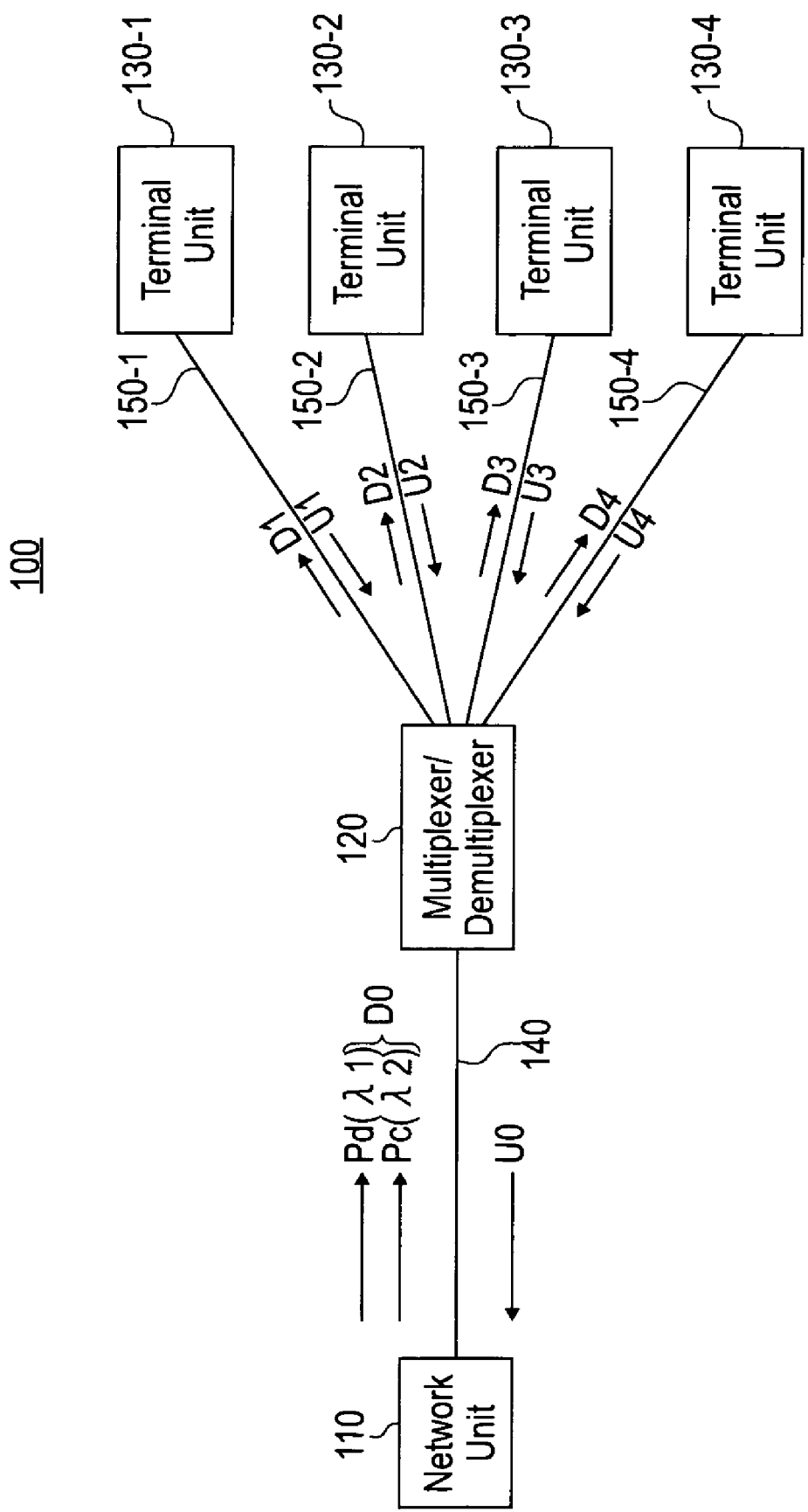
FIG. 1 is a bock diagram conceptually showing the overall configuration of an optical communication system according to embodiments of the present invention.

Embodiments of the present invention will be described below with reference to the drawings. In the drawings, the sizes and shapes of and disposition relationship between components are schematically shown to the extent that the present invention can be understood, and numerical conditions, as will be described below, are merely exemplifications.

First Embodiment

An optical communication system according to a first embodiment of the present invention will be described with reference to FIGS. 1 to 8.

FIG. 1 is a block diagram conceptually showing the overall configuration of a subscriber optical communication system 100 according to the present embodiment.

As shown in FIG. 1, the optical communication system 100 includes a network unit 110, an optical multiplexer/demultiplexer 120, a plurality of terminal units (four terminal units in the present embodiment) 130-1 to 130-4, and optical fibers 140, and 150-1 to 150-4.

The network unit 110 generates a downstream wavelength-multiplexed light D0 including a downstream signal light Pd of a first wavelength λ1 which includes a time-division multiplexed signal train, and an optical carrier Pc of a second wavelength λ2 which does not include a signal component. Furthermore, the network unit 110 sends the downstream wavelength-multiplexed light U0 to the optical multiplexer/demultiplexer 120 through the optical fiber 140. In addition, the network unit 110 receives a time-division multiplexed upstream signal light U0 from the optical multiplexer/demultiplexer 120 through the optical fiber 140 and time-division demultiplexes the upstream signal light U0. The optical multiplexer/demultiplexer 120 time-division demultiplexes the downstream wavelength-multiplexed light D0 received from the network unit 110 with the light D0 being wavelength-multiplexed, and thereby generates wavelength-multiplexed lights D1 to D4. The optical multiplexer/demultiplexer 120 then sends, through the optical fibers 150-1 to 150-4, the wavelength-multiplexed lights D1 to D4 to the terminal units 130-1 to 130-4, respectively. In addition, the optical multiplexer/demultiplexer 120 time-division multiplexes upstream signal lights U1 to U4 received from the terminal units 130-1 to 130-4, and thereby generates the time-division multiplexed light U0, and sends the time-divisionmultiplexedlightUO-tothenetworkunit110. Note that a dispersion compensator may be incorporated in the optical multiplexer/demultiplexer 120 to prevent waveform degradation.

The terminal units 130-1 to 130-4 receive the corresponding wavelength-multiplexed lights D1 to D4 and demultiplex the optical carriers of the first and second wavelength λ1 and λ2. Additionally the terminal units 130-1 to 130-4 modulate the optical carriers and thereby generate upstream signal lights U1 to U4, and send the upstream signal lights U1 to U4 to the optical multiplexer/demultiplexer 120.

Figure 2:
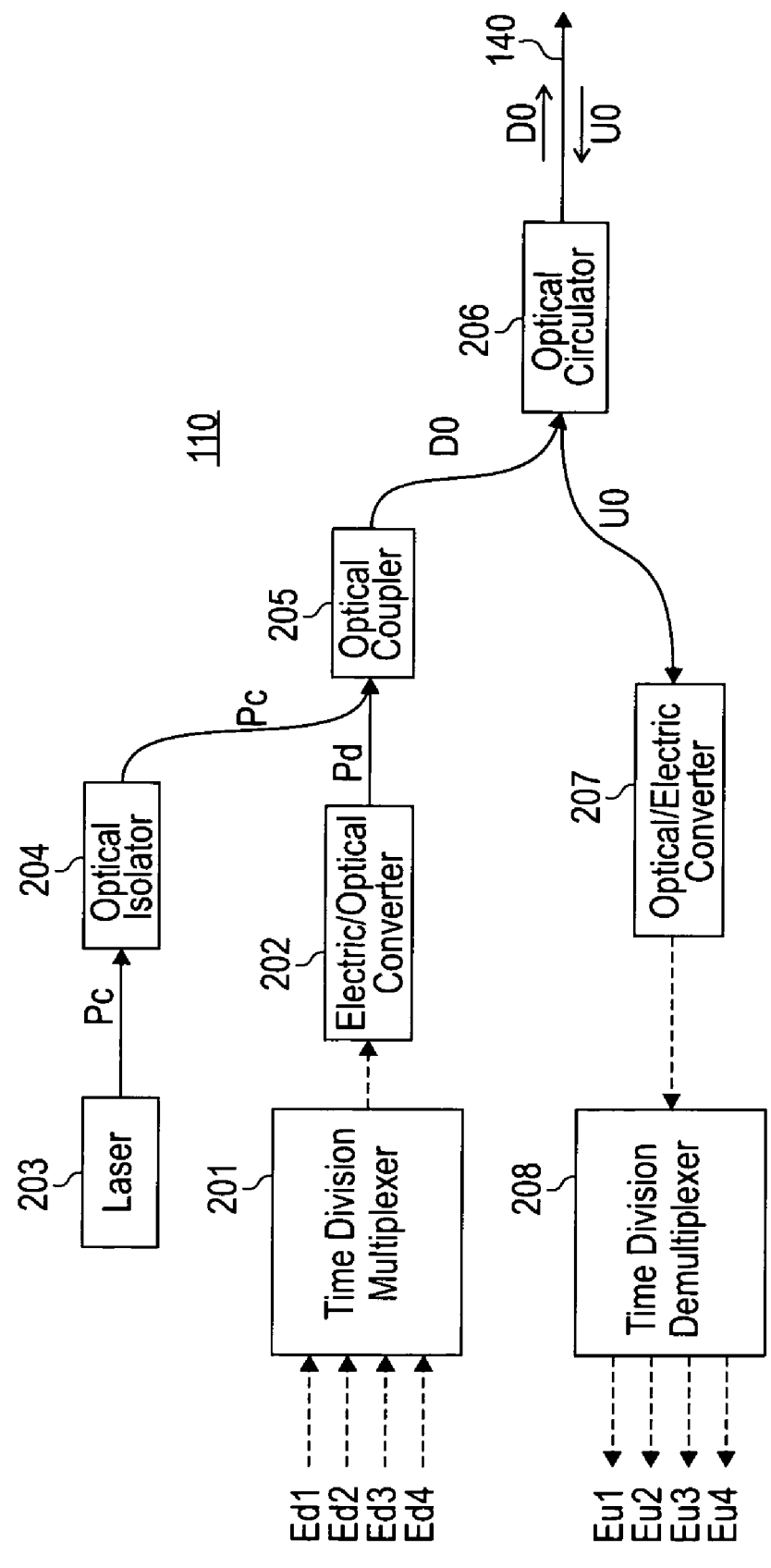
FIG. 2 is a block diagram schematically showing an internal configuration of a network unit according to a first embodiment.

FIG. 2 is a block diagram schematically showing the internal configuration of the network unit 110. In FIG. 2, solid lines represent optical signal lines and dotted lines represent electrical signal lines (the same applies to FIGS. 3, 4, 9, 10, 12, 13, 14, and 16).

As shown in FIG. 2, the network unit 110 includes a time division multiplexer 201, an electric/optical converter 202, a laser 203, i.e., a light source, an optical isolator 204, an optical coupler 205, an optical circulator 206, an optical/electric converter 207, and a time division demultiplexer 208.

The time division multiplexer 201 time-division multiplexes four electrical signal trains (e.g., communication packets) Ed1 to Ed4 input from an external apparatus (not shown) and outputs the time-division multiplexed signal trains.

The electric/optical converter 202 converts the time-division multiplexed signal train input from the time division multiplexer 201 into an optical signal train of the first wavelength λ1 (i.e., a downstream signal light Pd) and sends the downstream signal light Pd to the optical coupler 205.

The laser 203 outputs a CW (Continuous Wave) light Pc of the second wavelength λ2. As will be described later, the CW light Pc is used as an upstream communication optical carrier.

The optical isolator 204 guides the CW light Pc output from the laser 203 to the optical coupler 205. The optical isolator 204 is provided to prevent an upstream signal light input through the optical fiber 140 from entering the laser 203.

The optical coupler 205 couples the downstream signal light Pd input from the electric/optical converter 202 and the CW light Pc input from the optical isolator 204 and thereby generates a downstream wavelength-multiplexed light D0. The downstream wavelength-multiplexed light D0 is sent to the optical circulator 206.

The optical circulator 206 outputs to the optical fiber 140 the downstream wavelength-multiplexed light D0 input from the optical coupler 205. In addition, the optical circulator 206 sends to the optical/electric converter 207 an upstream signal light U0 input through the optical fiber 140.

The optical/electric converter 207 converts the upstream signal light U0 input from the optical circulator 206 into an electrical signal and outputs the electrical signal to the time division demultiplexer 208.

The time division demultiplexer 208 time-division demultiplexes the time-division multiplexed light U0 into four electrical signal trains Eu1 to Eu4 and outputs the electrical signal trains Eu1 to Eu4 to an external apparatus (not shown).

Figure 3:
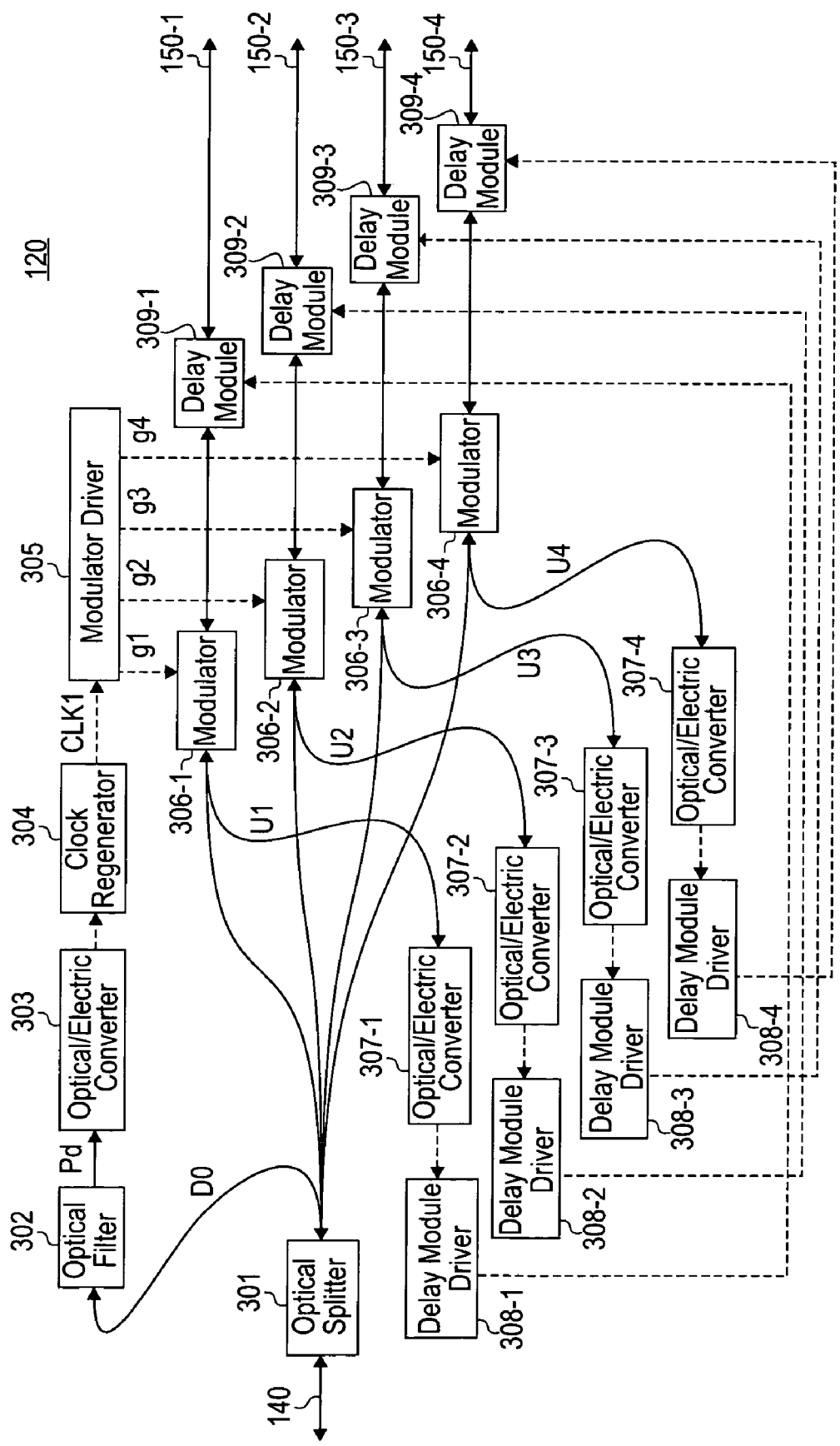
FIG. 3 is a block diagram schematically showing an internal configuration of an optical multiplexer/demultiplexer according to the first embodiment.

FIG. 3 is a block diagram schematically showing the internal configuration of the optical multiplexer/demultiplexer 120.

As shown in FIG. 3, the optical multiplexer/demultiplexer 120 includes an optical splitter 301, an optical filter 302, an optical/electric converter 303, a clock regenerator 304, a modulator driver 305, modulators 306-1 to 306-4, optical/electric converters 307-1 to 307-4, variable optical delay lines module drivers 308-1 to 308-4, and variable optical delay lines modules 309-1 to 309-4.

The optical splitter 301 receives the downstream wavelength-multiplexed light D0 through the optical fiber 140 and branches the downstream wavelength-multiplexed light D0 into two lights. The branched downstream wavelength-multiplexed lights D0 are sent to the optical filter 302 and the modulators 306-1 to 306-4.

The optical filter 302 receives the downstream wavelength-multiplexed light D0 and allows only the downstream signal light Pd of the first wavelength λ1 to pass therethrough.

The optical/electric converter 303 converts the downstream signal light Pd into an electrical signal.

The clock regenerator 304 regenerates a clock CLK1 which is synchronized with the downstream signal light Pd, from the electrical signal input from the optical/electric converter 303.

The modulator driver 305 drives the modulators 306-1 to 306-4 individually according to the clock CLK1. The drive control performed by the modulator driver 305 will be described in detail later.

The modulators 306-1 to 306-4 modulate the respective downstream wavelength-multiplexed lights D0 based on control by the modulator driver 305. By this, the downstream wavelength-multiplexed lights D0 are time-division demultiplexed with the lights D0 being wavelength multiplexed. In addition, the modulators 306-1 to 306-4 send upstream signal lights u1 to U4 input from the variable optical delay lines modules 309-1 to 309-4, respectively, to the optical splitter 301 and the optical/electric converters 307-1 to 307-4. As described above, the upstream signal sent to the optical/electric converters 307-1 to 307-4 are used as signals which indicate phase difference between the signal U1 to U4 and the signal g1 to g4.

The optical/electric converters 307-1 to 307-4 respectively output voltage signals (or current signals) according to the optical intensities of the input upstream signal lights U1 to U4.

The variable optical delay lines module drivers 308-1 to 308-4 control the delay times of the variable optical delay lines modules 309-1 to 309-4, according to the values of the signals input from the optical/electric converters 307-1 to 307-4.

The variable optical delay lines modules 309-1 to 309-4 send wavelength-multiplexed lights D1 to D4 input from the modulators 306-1 to 306-4, respectively, to the corresponding optical fibers 150-1 to 150-4. In addition, the variable optical delay lines modules 309-1 to 309-4 delay the upstream signal lights U1 to U4 input through the optical fibers 150-1 to 150-4 and send the upstream signal lights U1 to U4 to the modulators 306-1 to 306-4, respectively. The delay times of the upstream signal lights U1 to U4 are controlled such that timings at which the upstream signal lights U1 to U4 pass through the modulators 306-1 to 306-4 respectively match timings at which the wavelength-multiplexed lights D1 to D4 pass through the modulators 306-1 to 306-4 (which will be described later).

Figure 4:
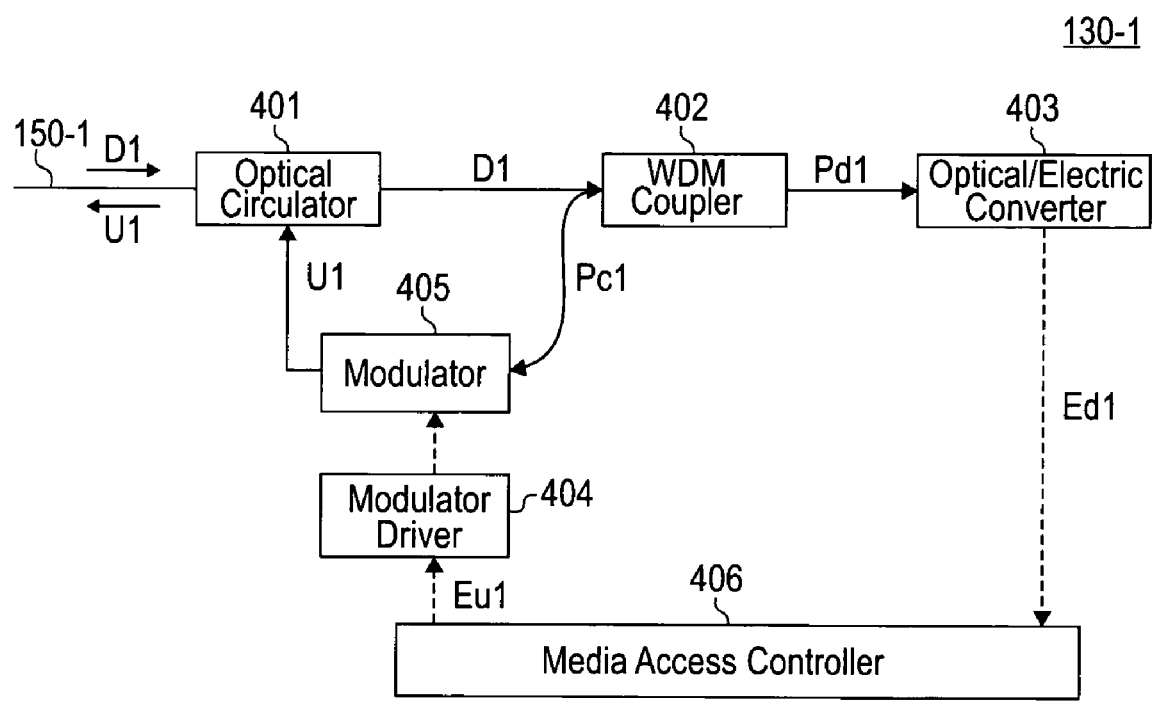
FIG. 4 is a block diagram schematically showing an internal configuration of a terminal unit according to the first embodiment.

FIG. 4 is a block diagram schematically showing the internal configuration of the terminal unit 130-1. Note that other terminal units 130-2 to 130-4 have the same internal configuration as the terminal unit 130-1.

As shown in FIG. 4, the terminal unit 130-1 includes an optical circulator 401, a WDM (Wavelength Division Multiplexing) coupler 402, an optical/electric converter 403, a modulator driver 404, a modulator 405 and a media access controller 406.

The optical circulator 401 sends to the WDM coupler 402 the wavelength-multiplexed light D1 input through the optical fiber 150-1, and outputs to the optical fiber 150-1 the upstream signal light U1 input from the modulator 405.

The WDM coupler 402 wavelength-demultiplexes the wavelength-multiplexed light D1 input from the optical circulator 401 into an optical signal train Pd1 of the first wavelength λ1 which corresponds to the electrical signal train Ed1, and an optical clock Pc1 of the second wavelength λ2 which corresponds to the CW light. The wavelength-multiplexed light D1 is, ad described above, generated by dividing the wavelength-multiplexed light D0, so the optical clock Pc1 is a light generated by cyclically dividing the CW light Pc by four.

The optical/electric converter 403 converts the optical signal train pd1 input from the WDM coupler 402 into an electrical signal. By this, the electrical signal train Ed1 (see FIG. 2) is reconstructed.

The media access controller 406 performs Media Access Control (MAC) defined by the second layer (i.e., data link layer) of an OSI (Open Systems Interconnection) reference model. The media access controller 406 receives the electrical signal train Ed1 from the optical/electric converter 403 and sends the transmission electrical signal train Eu1 to the modulator driver 404.

The modulator driver 404 drives the modulator 405 according to the signal value of the electrical signal train Eu1.

The modulator 405 modulates the CW light Pc1 input from the WDM coupler 402, according to drive control performed by the modulator driver 404. By this, the upstream signal light U1 having the CW light Pc1 as a carrier is generated.

Now, the operation of the optical communication system 100 will be described with reference to FIGS. 5 to 8.

Figure 5:
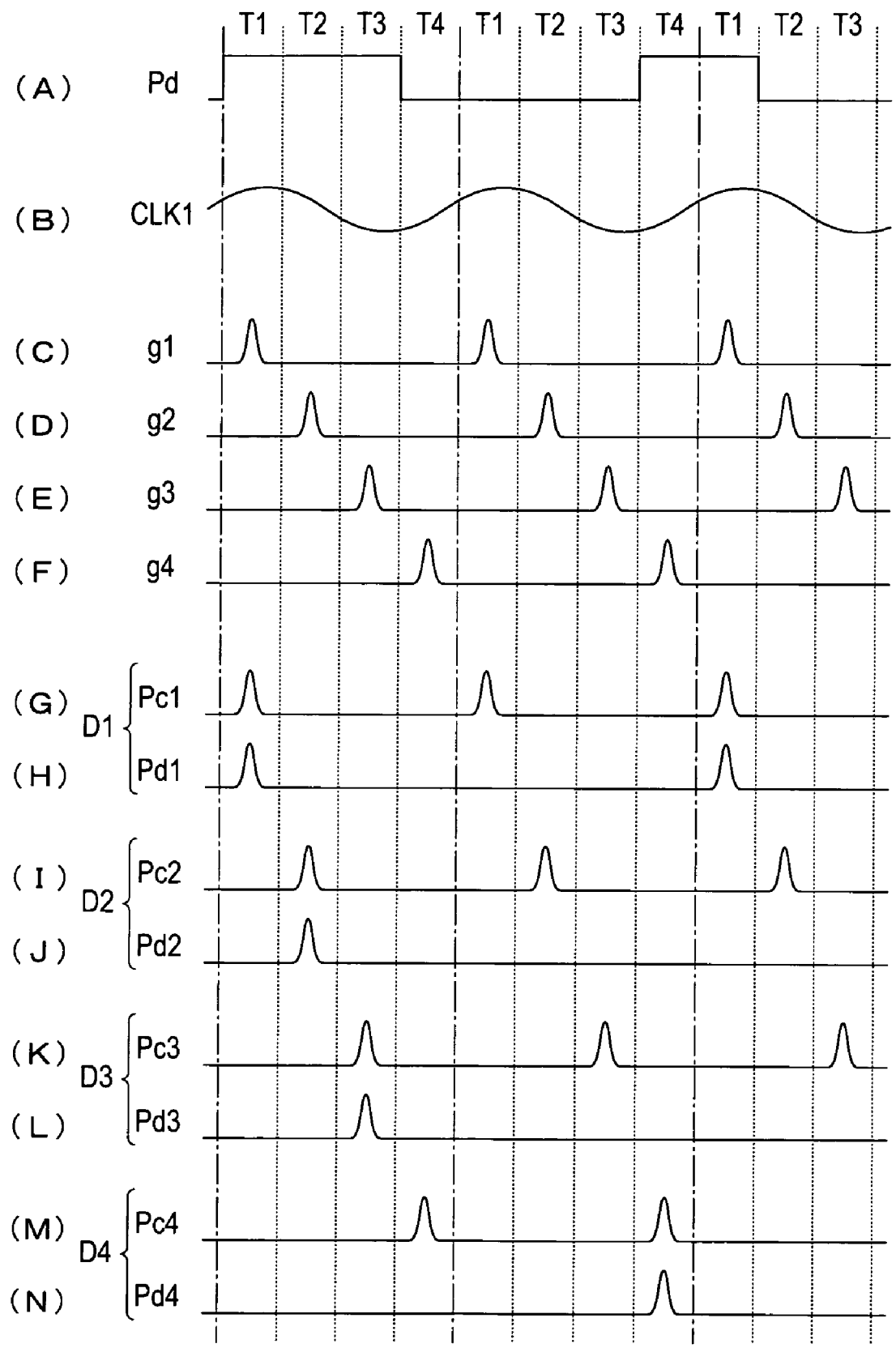
FIG. 5 is a conceptual signal waveform diagram for describing downstream communication in an optical communication system according to the first embodiment.

FIG. 5 is a conceptual signal waveform diagram for describing downstream communication in the optical communication system 100.

As described above, electrical signal trains Ed1 to Ed4 are input to the network unit 110 (see FIG. 2) from an external apparatus (not shown). The electrical signal trains Ed1 to Ed4 are time-division multiplexed by the time division multiplexer 201. The time-division multiplexed signal train is further converted into a downstream signal light Pd by the electric/optical converter 202. (A) in FIG. 5 conceptually shows an exemplary waveform of the downstream signal light Pd. The laser 203 generates and outputs a CW light Pc. These lights Pd and Pc are wavelength-multiplexed by the optical coupler 205 and become a downstream wavelength-multiplexed light D0. The downstream wavelength-multiplexed light D0 is output to the optical fiber 140 through the optical circulator 206, and then is received by the optical multiplexer/demultiplexer 120 (see FIG. 3).

The downstream wavelength-multiplexed light D0 is received by the optical multiplexer/demultiplexer 120 and then branched into two lights by the optical splitter 301. In one of the branched downstream wavelength-multiplexed lights D0, only the downstream signal light Pd is extracted by the optical filter 302 and converted into an electrical signal train by the optical/electric converter 303. Then, the electrical signal train is sent to the clock regenerator 304. The clock regenerator 304 regenerates a clock CLK1 which is synchronized with the electrical signal train. (B) in FIG. 5 shows the waveform of the regenerated clock CLK1.

The modulator driver 305 generates drive signals g1 to g4 according to the clock CLK1 and sends the drive signals g1 to g4 to the modulators 306-1 to 306-4, respectively. (C) to (F) in FIG. 5 show the waveforms of the drive signals g1 to g4, respectively. As can be seen from (C) to (F) in FIG. 5, the drive signals g1 to g4 are output to be delayed such that the phases of the drive signals g1 to g4 are shifted from each other by one-quarter of the period of the clock CLK1.

The modulators 306-1 to 306-4 modulate the respective downstream wavelength-multiplexed lights D0 based on the drive signals g1 to g4. That is, the modulators 306-1 to 306-4 operate as gates that extract only components of time slots T1, T2, T3, and T4, respectively, from the downstream wavelength-multiplexed lights D0 and allow the components to pass therethrough. By these gates, the downstream wavelength-multiplexed lights D0 are time-division demultiplexed and become wavelength-multiplexed lights D1 to D4. The wavelength-multiplexed light D1 is composed of an optical clock Pc1 (of the second wavelength $\lambda 2$; see (G) in FIG. 5) obtained by cyclically dividing the CW light Pc by four, and an optical signal Pd1 (of the first wavelength $\lambda 1$; see (H) in FIG. 5) corresponding to the electrical signal train Ed1. The wavelength-multiplexed light D2 is composed of an optical clock Pc2 (see (I) in FIG. 5) which is shifted from the optical clock Pc1 by a quarter period, and an optical signal Pd2 (see (J) in FIG. 5) corresponding to the electrical signal train Ed2. The wavelength-multiplexed light D3 is composed of an optical clock Pc3 (see (K) in FIG. 5) which is shifted from the optical clock Pc2 by a quarter period, and an optical signal Pd3 (see (L) in FIG. 5) corresponding to the electrical signal train Ed3. The wavelength-multiplexed light D4 is composed of an optical clock Pc4 (see (M) in FIG. 5) which is shifted from the optical clock Pc3 by a quarter period, and an optical signal Pd4 (see (N) in FIG. 5) corresponding to the electrical signal train Ed4. The wavelength-multiplexed lights D1 to D4 pass through the corresponding variable optical delay lines modules 309-1 to 309-4 and are output to the corresponding optical fibers 150-1 to 150-4, and then received by the corresponding terminal units 130-1 to 130-4 (see FIG. 4).

The wavelength-multiplexed light D1 received by the terminal unit 130-1 is sent to the WDM coupler 402 through the optical circulator 401. As described above, the WDM coupler 402 wavelength-demultiplexes the wavelength-multiplexed light D1 into the downstream signal light Pd1 of the first wavelength $\lambda 1$ and the optical clock Pc1 of the second wavelength $\lambda 2$. The optical/electric converter 403 regenerates the electrical signal train Ed1 from the downstream signal light Pd1 and sends the electrical signal train Ed1 to the media access controller 406.

Similarly, in other terminal units 130-2 to 130-4 also, the downstream signal lights Pd2 to Pd4 are wavelength-demultiplexed from the wavelength-multiplexed lights D2 to D4, respectively. Furthermore, the electrical signal trains Ed2 to Ed4 are regenerated from the downstream signal lights Pd2 to Pd4, respectively.

Figure 6:
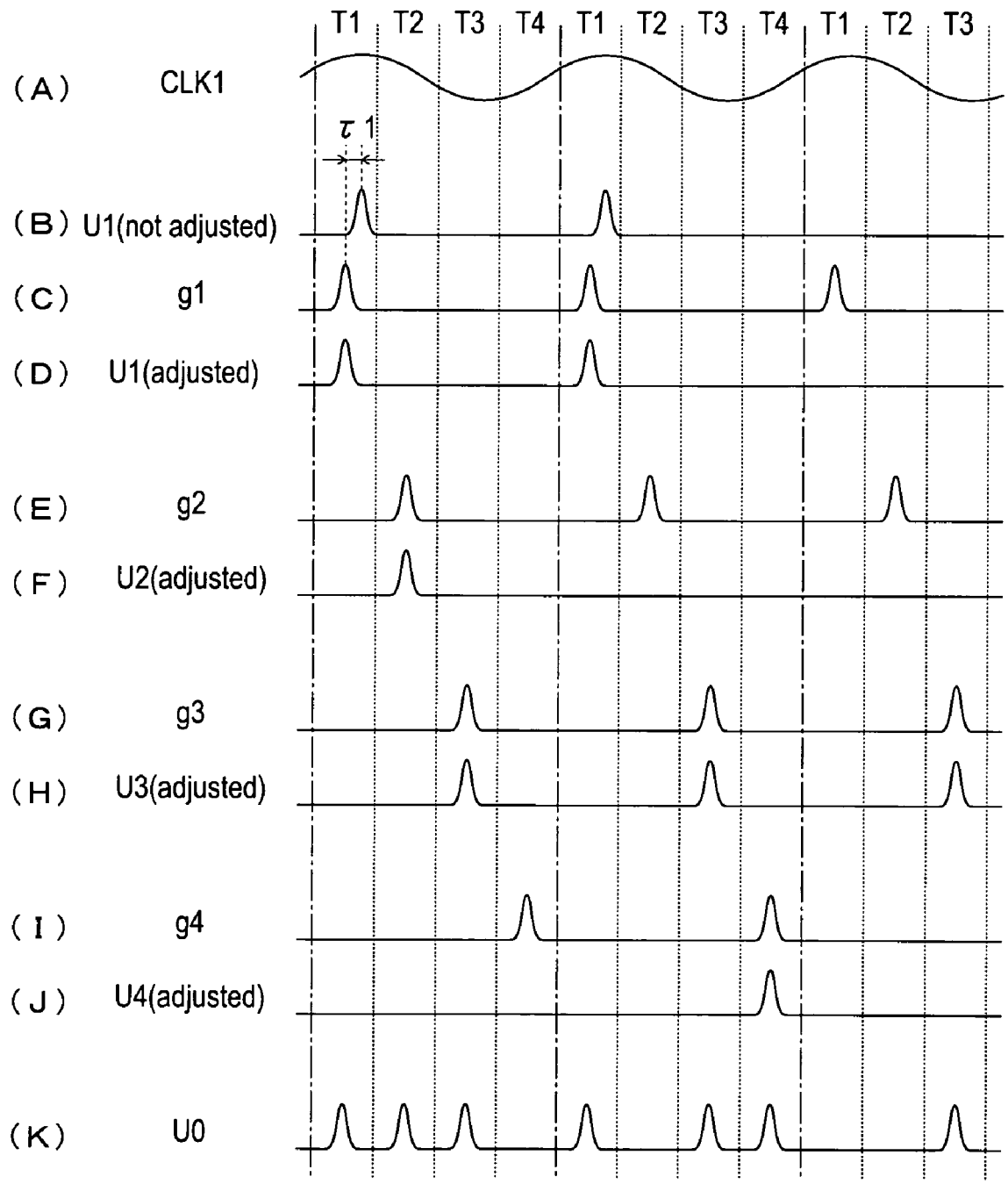
FIG. 6 is a conceptual signal waveform diagram for describing upstream communication in the optical communication system according to the first embodiment.

FIG. 6 is a conceptual signal waveform diagram for describing upstream communication in the optical communication system 100. (A) in FIG. 6 shows the waveform of the clock CLK1 regenerated by the clock regenerator 304 (see FIG. 3), and is the same as (B) in FIG. 5. (C), (E), (G), and (I) in FIG. 6 show the waveforms of the drive signals g1, g2, g3, and g4 output from the modulator driver 305, and are the same as (C) to (F) in FIG. 5.

In the terminal unit 130-1 (see FIG. 4), the optical clock Pc1 is sent to the modulator 405 from the WDM coupler 402. The modulator driver 404 drives the modulator 405 according to the electrical signal Eu1 input from the media access controller 406. By this, the upstream signal light U1 using the optical clock Pc1 as an optical carrier is generated. The upstream signal light U1 is output to the optical fiber 150-1 through the optical circulator 401 and sent to the optical multiplexer/demultiplexer 120 (see FIG. 3).

Similarly, in other terminal units 130-2 to 130-4 also, the upstream signal lights U2 to U4 using the optical clocks Pc2 to pc4 as optical carriers are generated. The upstream signal lights U2 to U4 are sent to the optical multiplexer/demultiplexer 120 through the optical fibers 150-2 to 150-4.

The variable optical delay lines modules 309-1 to 309-4 in the optical multiplexer/demultiplexer 120 receive the corresponding upstream signal lights U1 to U4 and send the upstream signal lightsU1 to U4 to the modulators 306-1 to 306-4, respectively. (B) in FIG. 6 is a waveform diagram showing timing at which the upstream signal light U1 passes through the modulator 306-1 immediately after upstream communication is started.

The modulators 306-1 to 306-4 send the upstream signal lights U1 to U4 to the optical splitter 301 and the optical/electric converters 307-1 to 307-4. The optical/electric converters 307-1 to 307-4 convert the optical intensities of the upstream signal lights U1 to U4 into voltage signals (or current signals) and send the voltage signals (or current signals) to the variable optical delay lines module drivers 308-1 to 308-4, respectively. The values of the voltage signals (or current signals) indicate the optical intensities of the upstream signal lights U1 to U4.

Figure 8:
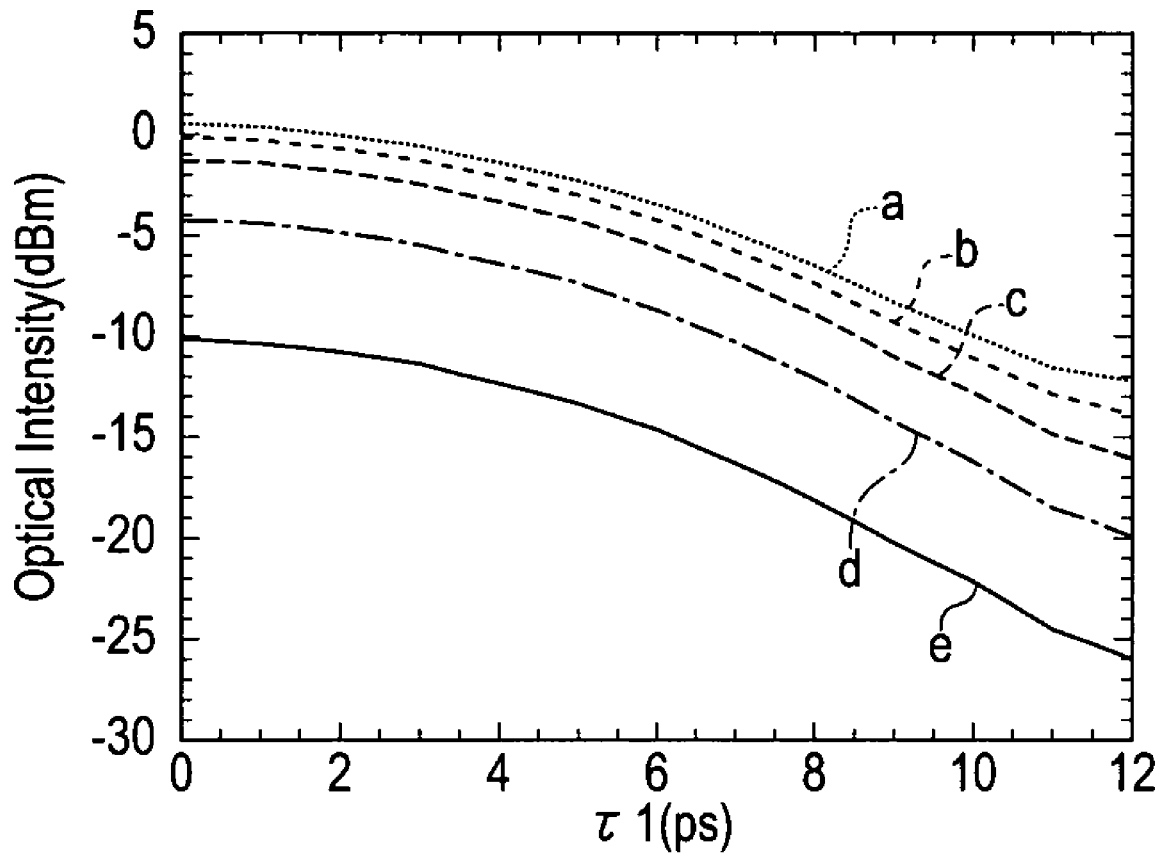
FIG. 8 is a graph for describing upstream communication in the optical communication system according to the first embodiment.

The variable optical delay lines module drivers 308-1 to 308-4 control the delay times of the variable optical delay lines modules 309-1 to 309-4, according to the values of the received signals. FIGS. 7A and 7B are conceptual signal waveform diagrams showing the relationship between the upstream signal light U1 input to the modulator 306-1, which is described to U1 (in) in FIGS. 7A and 7B, the upstream signal light U1 output from the modulator 306-1, which is described to U1 (out) in FIGS. 7A and 7B, and the drive signal g1. As shown in FIG. 7A, when the timing of the input light D0 (in) highly accurately matches the timing of the drive signal g1, the optical intensity of the output light U1 (out) is greater. On the other hand, as shown in FIG. 7B, when the degree of matching between the timing of the input light D0 (in) and the timing of the drive signal g1 is low, the optical intensity of the output light U1 (out) is smaller. FIG. 8 is a graph showing the relationship between the difference in timing between the input light D0($in$) and the drive signal g1 (see $\tau 1$ in FIG. 6), and the optical intensity of the output light U1 (out). As can be seen from FIG. 8, the optical intensity of the output light U1 (out) depends on the degree of matching between the timing of the input light D0($in$) and the timing of the drive signal g1, and depends on the optical path length of the modulator 306-1. The optical path length of the modulator 306-1 is constant and thus the aforementioned output signal value of the optical/electric converter 307-1 changes according to the degree of matching between the timing of the input light D0($in$) and the timing of the drive signal g1. The variable optical delay lines module driver 308-1 adjusts the delay time of the variable optical delay lines module 309-1 based on the output signal value of the optical/electric converter 307-1 such that the optical intensity of the output light D1 (out)

becomes as great as possible. By this, the timing of the upstream signal light U1 highly accurately matches the timing of the drive signal g1 (see (D) in FIG. 6). In the variable optical delay lines modules 309-2 to 309-4 also, the same adjustment is performed. By this, the timing of the upstream signal lights U2 to U4 also highly accurately matches the timing of the drive signals g2 to g4 (see (E) to (J) in FIG. 6).

The upstream signal lights U1 to U4 are output from the modulators 306-1 to 306-4, respectively, and coupled by the optical splitter 301. As described above, since the timing of the upstream signal lights U1 to U4 is adjusted using the drive signals g1 to g4, the upstream signal lights U1 to U4 are highly accurately time-division multiplexed (see (K) in FIG. 6) when theyarecoupledintheopticalsplitter301. The upstream signal light U0 obtained through the aforementioned time division multiplexing is sent to the network unit110 (see FIG. 2) through the optical fiber 140.

The upstream signal light U0 is received by the network unit 110 (see FIG. 2), sent to the optical/electric converter 207 through the optical circulator 206, and then converted into an electrical signal train. The time division demultiplexer 208 time-division demultiplexes the electrical signal train into four electrical signal trains Eu1 to Eu4. The electrical signal trains Eu1 to Eu4 are output to an external apparatus.

As described above, in the present embodiment, by controlling the delay times according to the optical intensities of upstream signal lights U1 to U4 output respectively from the modulators 306-1 to 306-4 in the optical multiplexer/demultiplexer 120, the upstream signal lights U1 to U4 can be time-division multiplexed. Therefore, the network unit 110 and the terminal units 130-1 to 130-4 do not need to control the timing of the upstream signal lights U1 to U4. Hence, according to the present embodiment, by simplifying timing control, the system construction costs can be reduced.

Second Embodiment

Now, an optical communication system according to a second embodiment of the present invention will be described with reference to FIGS. 9 to 11.

In the aforementioned first embodiment, in the optical multiplexer/demultiplexer 120, a clock used to time-division multiplex a downstream wavelength-multiplexed light D0 is regenerated from a downstream signal light Pd. On the other hand, in the present embodiment, as the clock, an upstream communication optical carrier which is generated in the network unit is used. With the present embodiment, the system construction costs can be further reduced.

The overall configuration of a subscriber optical communication system according to the present embodiment is the same as that in the first embodiment (see FIG. 1) and thus the description thereof is not repeated.

Figure 9:
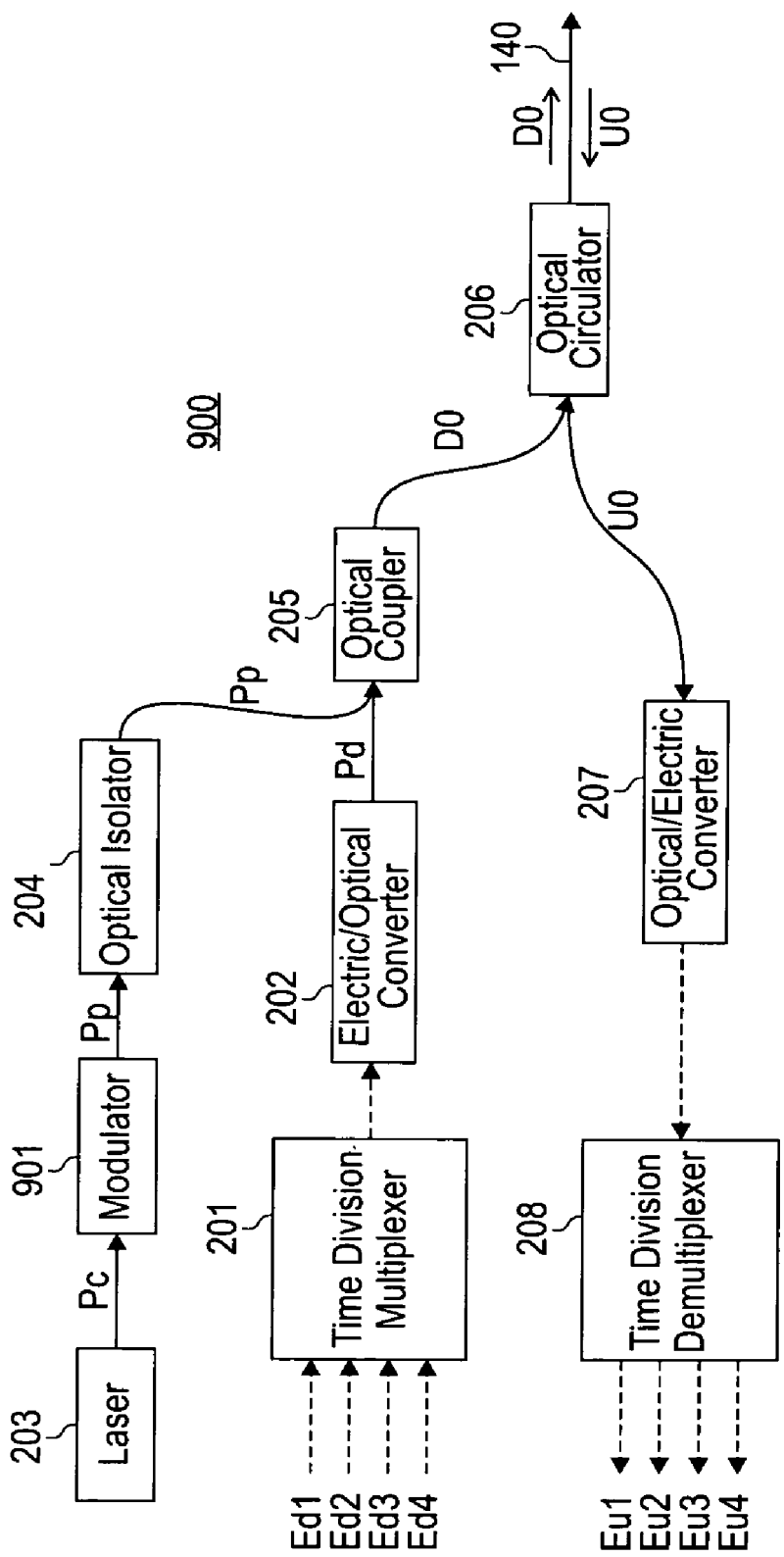
FIG. 9 is a block diagram schematically showing an internal configuration of a network unit according to a second embodiment.

FIG. 9 is a block diagram schematically showing the internal configuration of a network unit 900 according to the present embodiment. In FIG. 9, the components denoted by the same reference numerals as those in FIG. 2 represent the same components in FIG. 2.

As shown in FIG. 9, the network unit 900 includes a modulator 901. The modulator 901 modulates a CW light Pc input from a laser 203 and thereby generates a pulse light Pp. The pulse light Pp is sent, as an upstream communication optical carrier, to an optical coupler 205.

Figure 10:
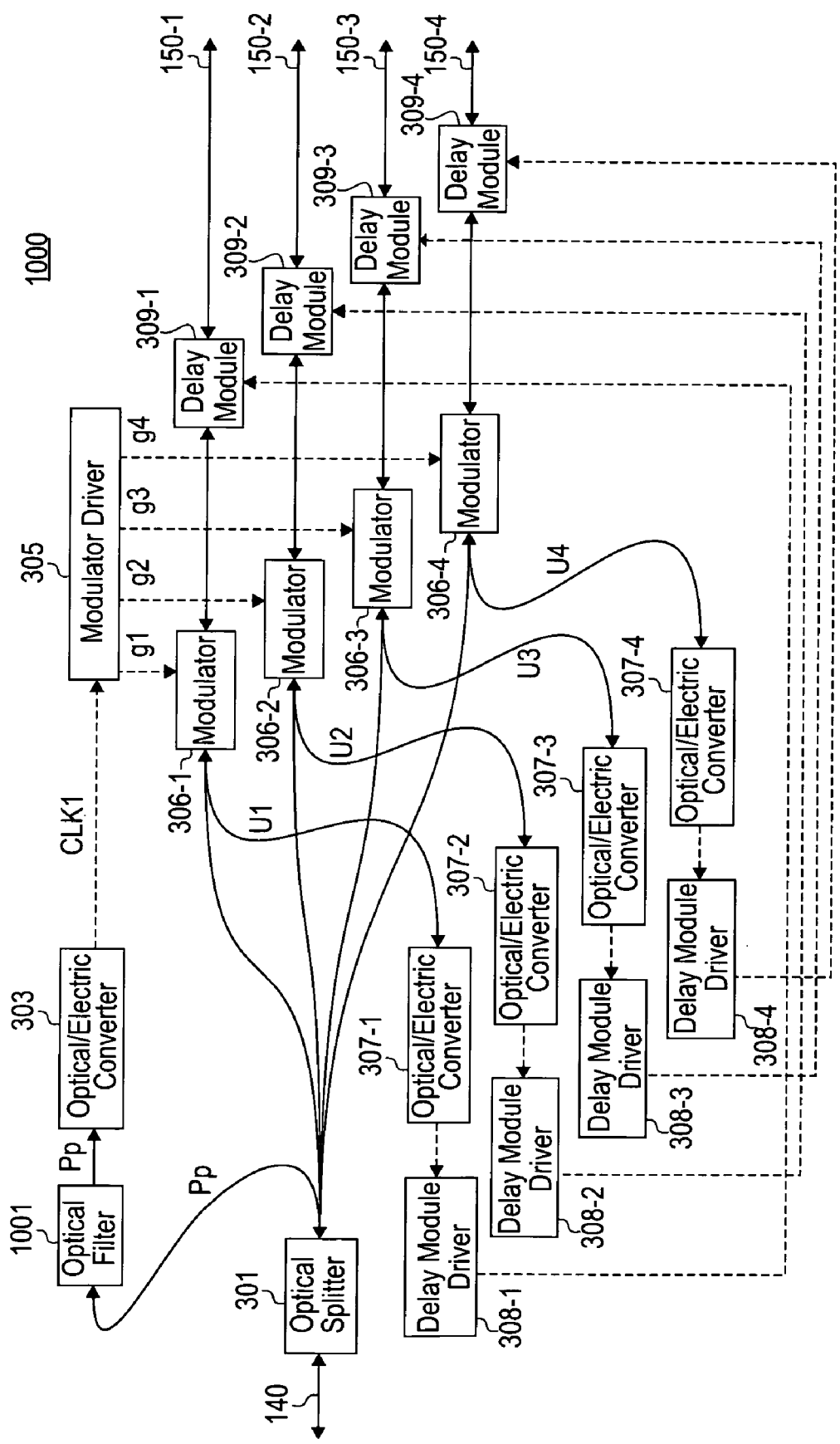
FIG. 10 is a block diagram schematically showing an internal configuration of an optical multiplexer/demultiplexer according to the second embodiment.
Figure 11:
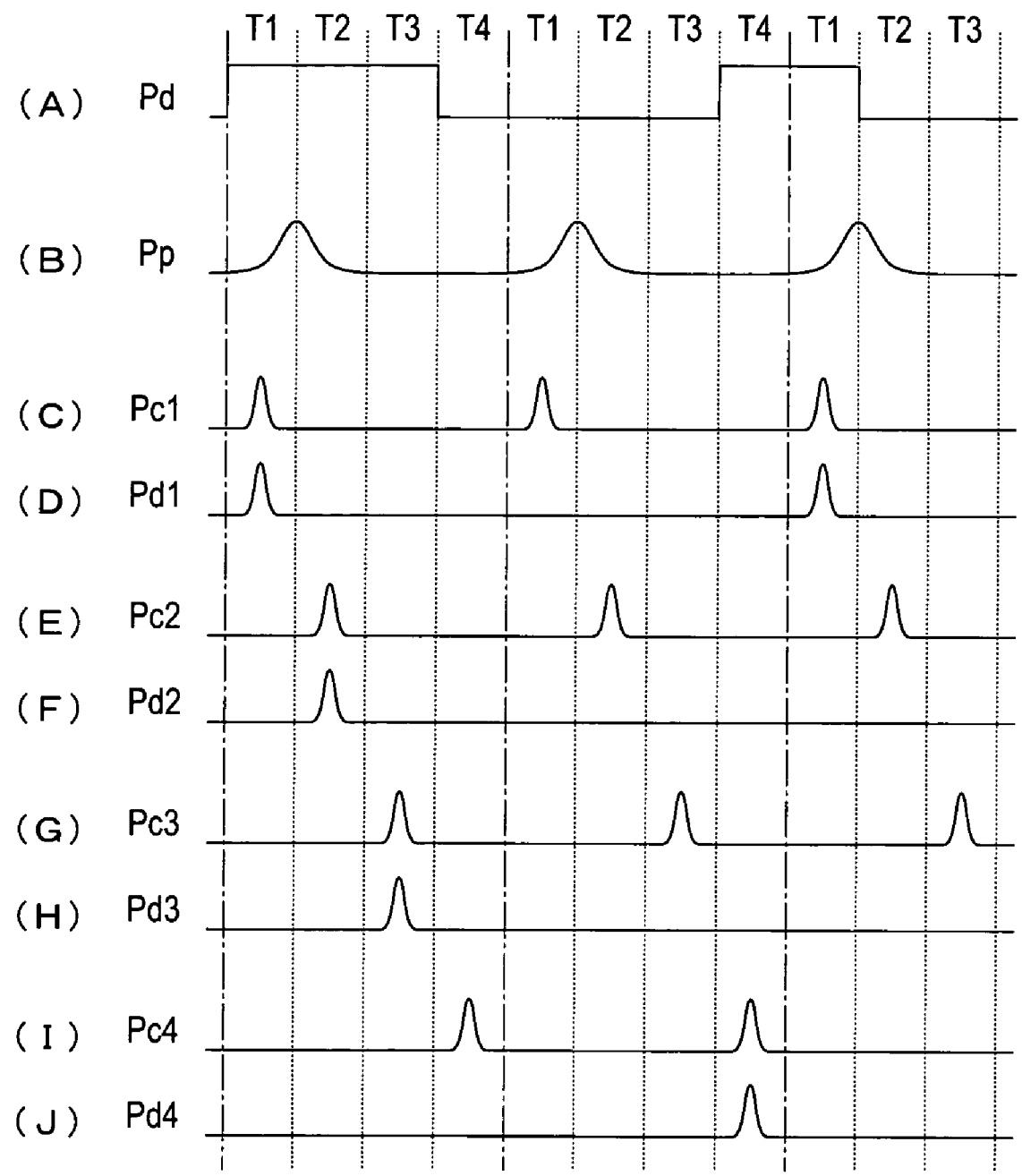
FIG. 11 is a conceptual signal waveform diagram for describing downstream communication in an optical communication system according to the second embodiment.

FIG. 10 is a block diagram schematically showing the internal configuration of an optical multiplexer/demultiplexer 1000 according to the present embodiment. In FIG. 10, the components denoted by the same reference numerals as those in FIG. 3 represent the same components in FIG. 3.

As shown in FIG. 10, the optical multiplexer/demultiplexer 1000 according to the present embodiment includes an optical filter 1001 which allows only the second wavelength λ2 to pass therethrough, in place of the optical filter 302 of the first embodiment (which allows only the first wavelength λ1 to pass therethrough).

In addition, the optical multiplexer/demultiplexer 1000 according to the present embodiment is different from the optical multiplexer/demultiplexer 120 according to the first embodiment in that the clock regenerator 304 is not provided.

The internal configuration of the terminal units is the same as that in the first embodiment.

The downstream communication operation of the optical communication system according to the present embodiment will be described below with reference to a conceptual signal waveform diagram of FIG. 11.

As in the first embodiment, electrical signal trains Ed1 to Ed4 input to the network unit 900 (see FIG. 9) from an external apparatus are time-division multiplexed by the time division multiplexer 201. The time-division multiplexed signal train is further converted into a downstream signal light Pd by the electric/optical converter 202. (A) in FIG. 11 conceptually shows an exemplary waveform of the downstream signal light Pd. The laser 203 generates and outputs a CW light Pc. The modulator 901 modulates the CW light Pc and thereby generates an optical carrier Pp of a pulse waveform. These lights Pd and Pp are wavelength-multiplexed by the optical coupler 205 and become a downstream wavelength-multiplexed light D0. The downstream wavelength-multiplexed light D0 is output to the optical fiber 140 through the optical circulator 206 and then received by the optical multiplexer/demultiplexer 1000 (see FIG. 10).

The downstream wavelength-multiplexed light D0 received by the optical multiplexer/demultiplexer 1000 is branched into two lights by the optical splitter 301. The optical filter 1001 extracts only the optical pulse carrier Pp from one of the branched downstream wavelength-multiplexed lights D0. (B) in FIG. 11 shows the waveform of the optical pulse carrier Pp. The optical/electric converter 303 converts the optical pulse carrier Pp into an electrical signal train CLK1.

As in the first embodiment, the modulator driver 305 generates drive signals g1 to g4 according to the electrical signal train CLK1 and sends the drive signals g1 to g4 to the modulators 306-1 to 306-4, respectively.

The modulators 306-1 to 306-4 modulate the respective downstream wavelength-multiplexed lights D0 based on the drive signals g1 to g4. By this, the downstream wavelength-multiplexed lights D0 are time-division demultiplexed and become wavelength-multiplexed lights D1 to D4. The wavelength-multiplexed light D1 is composed of an optical clock Pc1 (of the second wavelength λ2; see (C) in FIG. 11) and an optical signal Pd1 (of the first wavelength λ1; see (D) in FIG. 11) corresponding to the electrical signal train Ed1. The optical clock Pc1 corresponds to a pulse obtained by cyclically dividing the CW light Pc by four. The wavelength-multiplexed light D2 is composed of an optical clock Pc2 (see (E) in FIG. 11) which is shifted from the optical clock Pc1 by a quarter period, and an optical signal Pd2 (see (F) in FIG. 11) corresponding to the electrical signal train Ed2. Similarly, the wavelength-multiplexed light D3 is composed of an optical clock Pc3 (see (G) in FIG. 11) which is shifted from the optical clock Pc2 by a quarter period, and an optical signal Pd3 (see (H) in FIG. 11) corresponding to the electrical signal train Ed3. The wavelength-multiplexed light D4 is composed of an optical clock Pc4 (see (I) in FIG. 11) which is shifted from the optical clock Pc3 by a quarter period, and an optical signal Pd4 (see (J) in FIG. 11) corresponding to the electrical signal train Ed4. The wavelength-multiplexed lights D1 to D4 pass through the corresponding variable optical delay lines modules 309-1 to 309-4, output to the corresponding optical fibers 150-1 to 150-4, and then received by the corresponding terminal units 130-1 to 130-4 (see FIG. 4).

The operation of the terminal units 130-1 to 130-4 is the same as that in the first embodiment and thus the description thereof is not repeated.

In addition, the upstream communication operation of the optical communication system according to the present embodiment is the same as that in the first embodiment and thus the description thereof is not repeated.

As described above, according to the optical communication system of the present embodiment, an expensive clock regenerator does not need to be provided in the optical multiplexer/demultiplexer 1000. Therefore, the system construction costs can be further reduced over the first embodiment.

Moreover, in the present embodiment also, for the same reasons as those described in the first embodiment, by simplifying timing control, the system construction costs can be reduced.

Third Embodiment

Now, an optical communication system according to a third embodiment of the present invention will be described with reference to FIGS. 12 to 15.

The aforementioned first and second embodiments have described the case in which Time Division Multiplexing is used not only in upstream communication but also in downstream communication. On the other hand, in the present embodiment, multiplexing using identification information is performed on downstream communication.

The overall configuration of a subscriber optical communication system according to the present embodiment is the same as that in the first embodiment (see FIG. 1) and thus the description thereof is not repeated.

Figure 12:
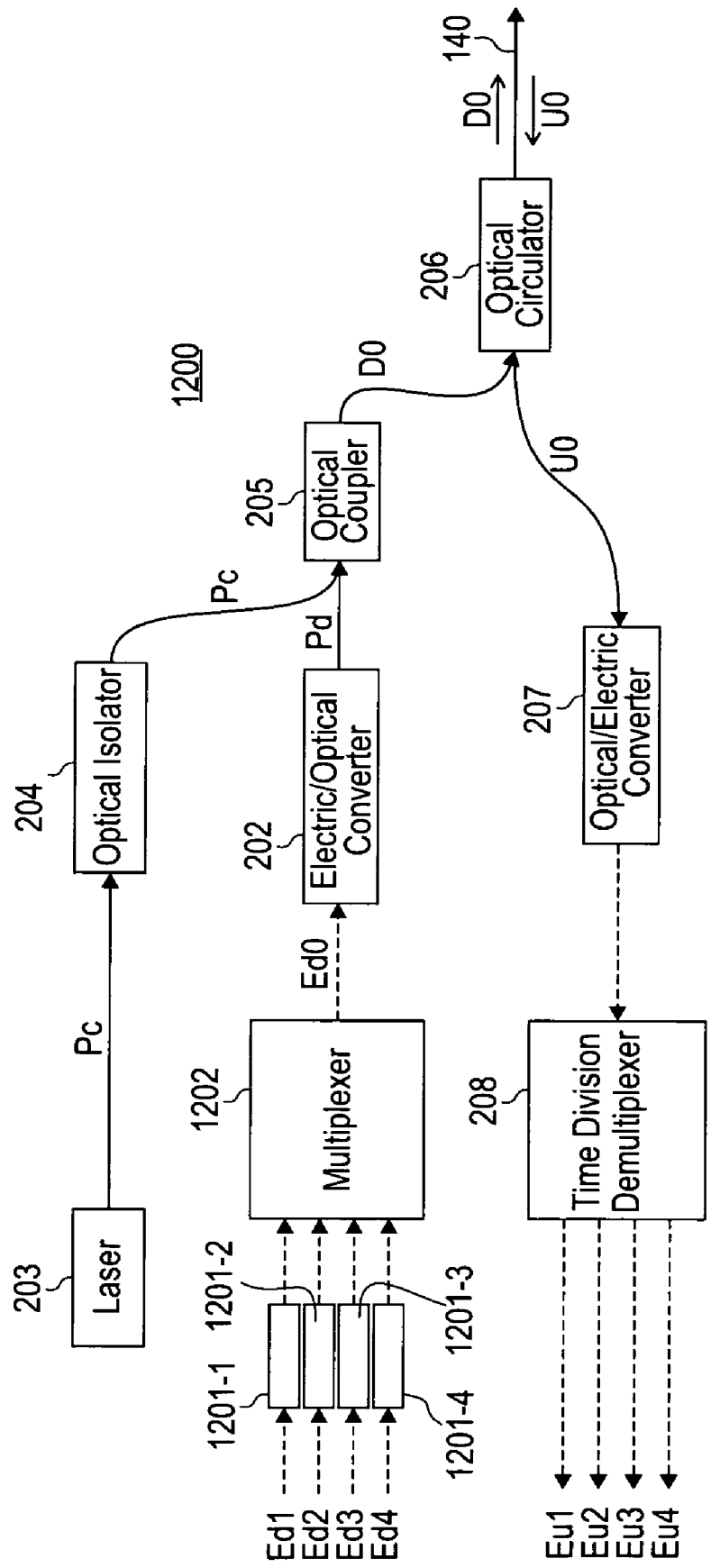
FIG. 12 is a block diagram schematically showing an internal configuration of a network unit according to a third embodiment.

FIG. 12 is a block diagram schematically showing the internal configuration of a network unit 1200 according to the present embodiment. In FIG. 12, the components denoted by the same reference numerals as those in FIG. 2 represent the same components in FIG. 2.

As shown in FIG. 12, the network unit 1200 includes identification information assigners 1201-1 to 1201-4 and a multiplexer 1202.

In the present embodiment, each of electrical signal trains Ed1 to Ed4 composes a communication packet.

The identification information assigners 1201-1 to 1201-4 receive the corresponding electrical signal trains Ed1 to Ed4, i.e., communication packets, and assign identification information to the respective headers of the electrical signal trains Ed1 to Ed4. The identification information is defined to distinguish between the terminal units 130-1 to 130-4 that receive the electrical signal trains Ed1 to Ed4.

The multiplexer 1202 sequentially combines together, for example in the unit of packet, the electrical signal trains Ed1 to Ed4 received from the identification information assigners 1201-1 to 1201-4, and thereby generates a multiplexed electrical signal train Ed0.

Figure 13:
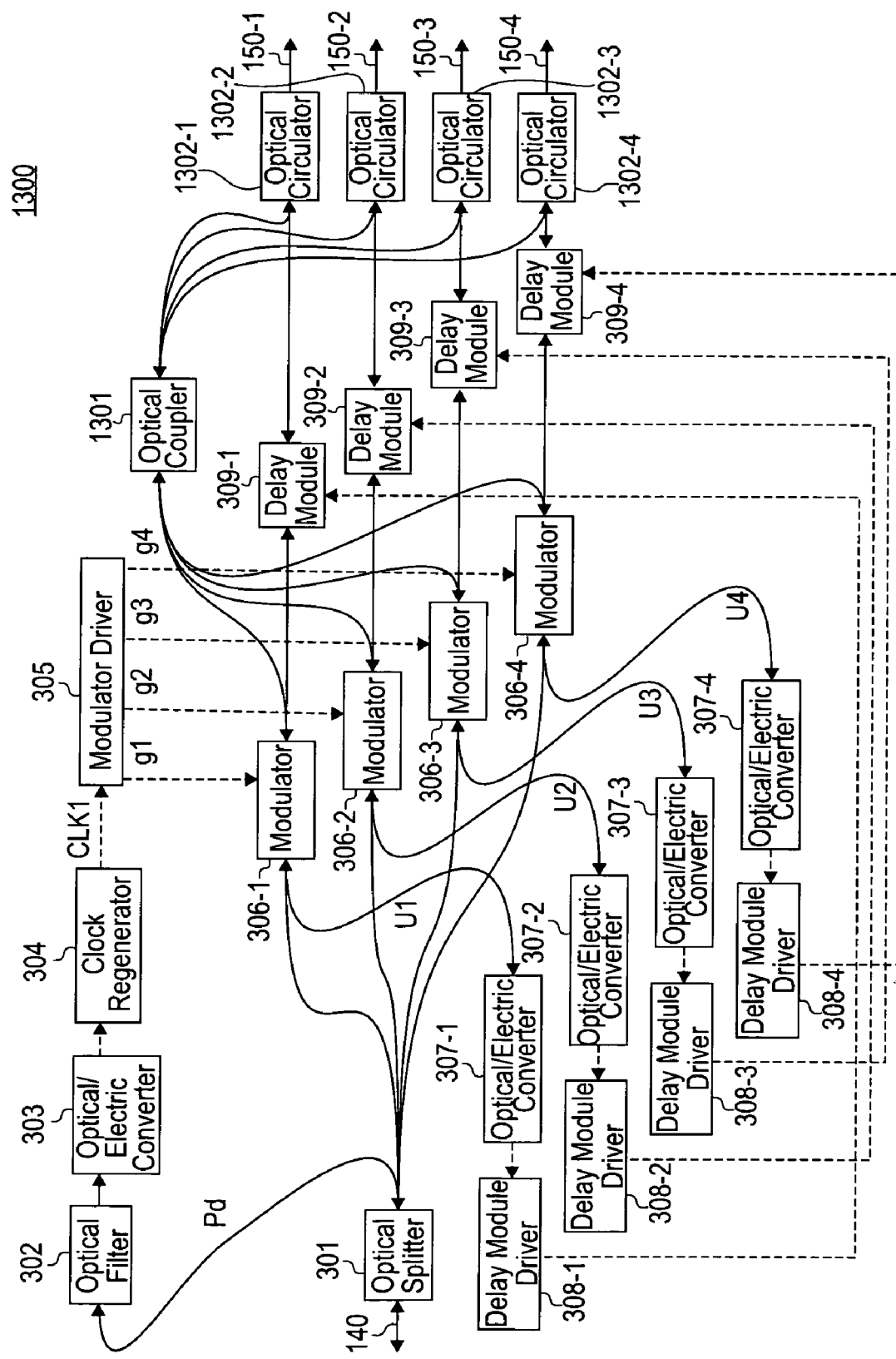
FIG. 13 is a block diagram schematically showing an internal configuration of an optical multiplexer/demultiplexer according to the third embodiment.

FIG. 13 is a block diagram schematically showing the internal configuration of an optical multiplexer/demultiplexer 1300 according to the present embodiment. In FIG. 13, the components denoted by the same reference numerals as those in FIG. 3 represent the same components in FIG. 3.

As shown in FIG. 13, the optical multiplexer/demultiplexer 1300 includes an optical coupler 1301 and optical circulators 1302-1 to 1302-4.

The optical coupler 1301 re-couples downstream optical signal trains Pd1 to Pd4 output from the modulators 306-1 to 306-4, respectively, and thereby regenerates a downstream wavelength-multiplexed light D0, and outputs the downstream wavelength-multiplexed light D0 to the optical circulators 1302-1 to 1302-4.

The optical circulators 1302-1 to 1302-4 output to the optical fibers 150-1 to 150-4 the respective downstream wavelength-multiplexed lights D0 input from the optical coupler 1301, and output to the corresponding variable optical delay lines modules 309-1 to 309-4 upstream signal lights U1 to U4 input through the optical fibers 150-1 to 150-4, respectively.

Figure 14:
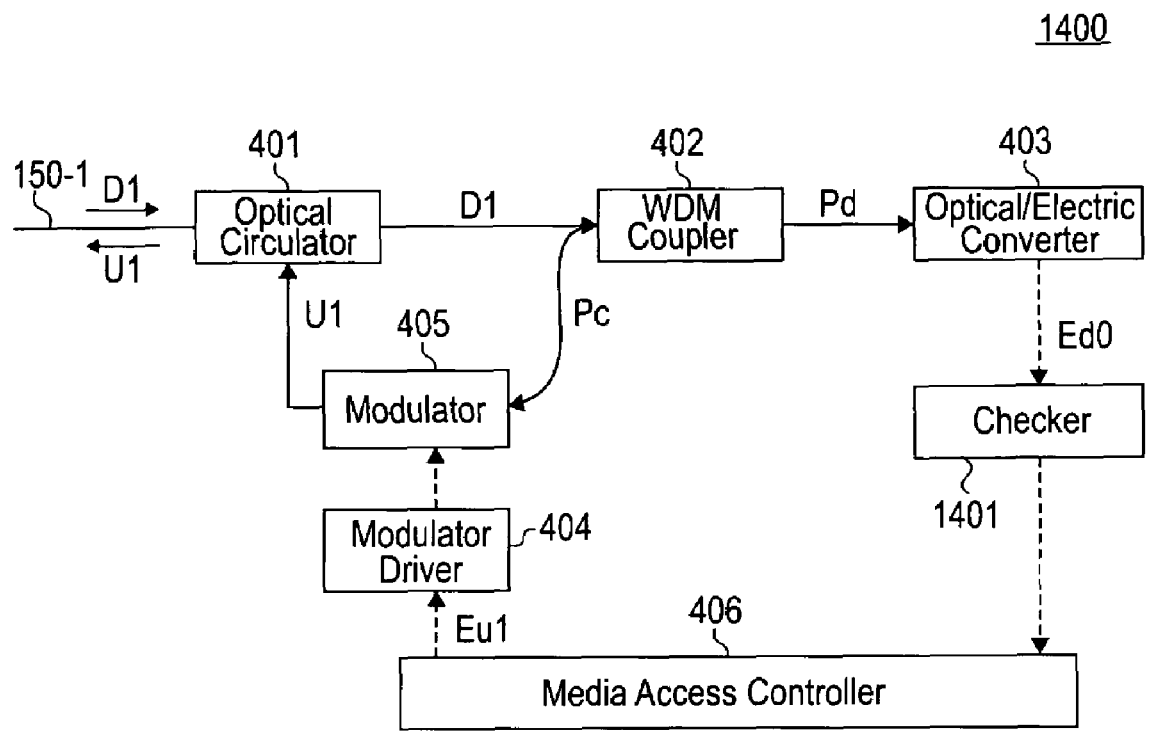
FIG. 14 is a block diagram schematically showing an internal configuration of a terminal unit according to the third embodiment.

FIG. 14 is a block diagram schematically showing the internal configuration of a terminal unit 1400 according to the present embodiment. In FIG. 14, the components denoted by the same reference numerals as those in FIG. 4 represent the same components in FIG. 4.

As shown in FIG. 14, the terminal unit 1400 includes a checker 1401. The checker 1401 identifies the header of a communication packet from an electrical signal train Ed0 reconstructed by the optical/electric converter 403, and sequentially reads identification information from the header. Then, the checker 1401 determines, based on the identification information, whether the destination of the communication packet is the terminal unit 1400. If it is determined that the destination of the communication packet is the terminal unit 1400, the checker 1401 transfers the communication packet to the media access controller 406. On the other hand, if it is determined that the destination of the communication packet is not the terminal unit 1400, the checker 1401 discards the communication packet.

Figure 15:
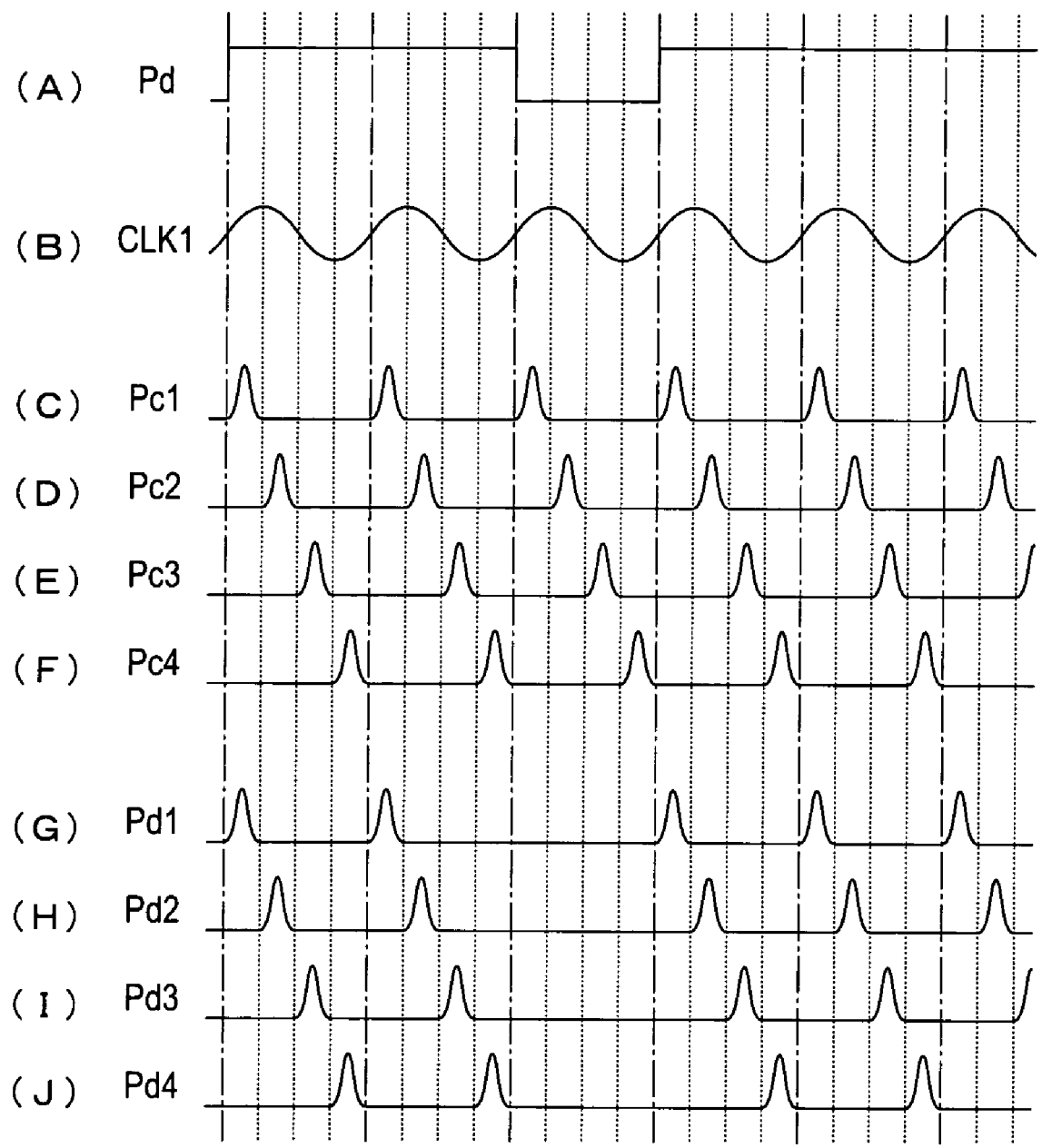
FIG. 15 is a conceptual signal waveform diagram for describing downstream communication in an optical communication system according to the third embodiment.

The downstream communication operation of the optical communication system according to the present embodiment will be described below with reference to a conceptual signal waveform diagram of FIG. 15.

The identification information assigners 1201-1 to 1201-4 receive the corresponding electrical signal trains Ed1 to Ed4 from an external apparatus (not shown), assign identification information to the respective headers of the electrical signal trains Ed1 to Ed4, and then send the electrical signal trains Ed1 to Ed4 to the multiplexer 1202.

The multiplexer 1202 sequentially combines together the electrical signal trains Ed1 to Ed4 and thereby generates an electrical signal train Ed0, and sends the electrical signal train Ed0 to the electric/optical converter 202. The electrical signal train Ed0 is converted into a downstream signal light Pd by the electric/optical converter 202. (A) in FIG. 15 conceptually shows an exemplary waveform of the downstream signal light Pd. The laser 203 generates and outputs a CW light Pc. These lights Pd and Pc are wavelength-multiplexed by the optical coupler 205 and become a downstream wavelength-multiplexed light D0. The downstream wavelength-multiplexed light D0 is output to the optical fiber 140 through the optical circulator 206.

The downstream wavelength-multiplexed light D0 is received by the optical multiplexer/demultiplexer 1300 and, as in the first embodiment, a clock CLK1 are regenerated from the downstream signal light Pd. (B) in FIG. 15 shows the waveform of the regenerated clock CLK1.

The modulator driver 305 drives, as in the first embodiment, the modulators 306-1 to 306-4. By this, the modulators 306-1 to 306-4 time-division demultiplex the respective downstream wavelength-multiplexed lights D0 and thereby generate wavelength-multiplexed lights D1 to D4. As in the first embodiment, the wavelength-multiplexed lights D1 to D4 are respectively composed of optical clocks Pc to Pc4 (of the second wavelength $\lambda 2$; see (C) to (F) in FIG. 15) obtained by cyclically dividing the CW light Pc by four and optical signals Pd1 to Pd4 (of the first wavelength $\lambda 1$; see (G) to (J) in FIG. 15).

The wavelength-multiplexed lights D1 to D4 are re-coupled by the optical coupler 1301. By this, the downstream wavelength-multiplexed light D0 is regenerated. The downstream wavelength-multiplexed light D0 is output to the optical fibers 150-1 to 150-4 through the optical circulators 1302-1 to 1302-4, respectively. As a result, in the present embodiment, the same downstream wavelength-multiplexed light D0 is sent to four terminal units 1400.

The downstream wavelength-multiplexed light D1 received by the terminal unit 1400 is sent to the WDM coupler 402 through the optical circulator 401. The WDM coupler 402 wavelength-demultiplexes the downstream wavelength-multiplexed light D1 into the downstream signal light Pd of the first wavelength $\lambda 1$ and the optical clock Pc of the second wavelength $\lambda 2$. The optical/electric converter 403 regenerates the electrical signal train Ed0 from the downstream signal light Pd.

The checker 1401 reads identification information from the header of each communication packet included in the electrical signal train Ed0 and determines based on the identification information the destinations of the communication packets. The checker 1401 then transfers only a communication packet whose destination is the terminal unit 1400, to the media access controller 406.

The upstream communication operation of the optical communication system according to the present embodiment is the same as that in the first embodiment and thus the description thereof is not repeated.

As described above, according to the optical communication system of the present embodiment, multiplexing using identification information can be performed on downstream communication. As in the case of the aforementioned first and second embodiments, when Time Division Multiplexing is adopted in downstream communication, communication time can be evenly assigned to all of the terminal units. Therefore, even when a transmission signal with respect to a certain terminal unit is not present, the communication band for other terminal units cannot be increased. On the other hand, in the communication system according to the present embodiment, since logical multiplexing is performed using identification information, the downstream communication band ratio of each terminal unit can be appropriately changed according to the conditions of use. Thus, according to the present embodiment, by increasing the downstream transmission efficiency, the utilization band of each user apparatus can be substantially increased.

In addition, according to the present embodiment, since the terminal units 1400 receive all downstream signal lights, flexible services, such as multicasting, can be offered.

Fourth Embodiment

Now, an optical communication system according to a fourth embodiment of the present invention will be described with reference to FIGS. 16 to 18.

The aforementioned first to third embodiments describe the case in which, in the network unit, electrical signal trains Ed1 to Ed4 are time-division multiplexed and then the time-division multiplexed train is converted into an optical signal Pd, and an upstream signal light U0 is converted into an electrical signal and then the electrical signal is time-division demultiplexed. On the other hand, in the present embodiment, an optical signal train Pd is generated by time-division multiplexing a plurality of optical signal trains and an upstream signal light U0 is time-division demultiplexed and then converted to electrical signal trains.

The overall configuration of a subscriber optical communication system according to the present embodiment is the same as that in the first embodiment (see FIG. 1) and thus the description thereof is not repeated.

Figure 16:
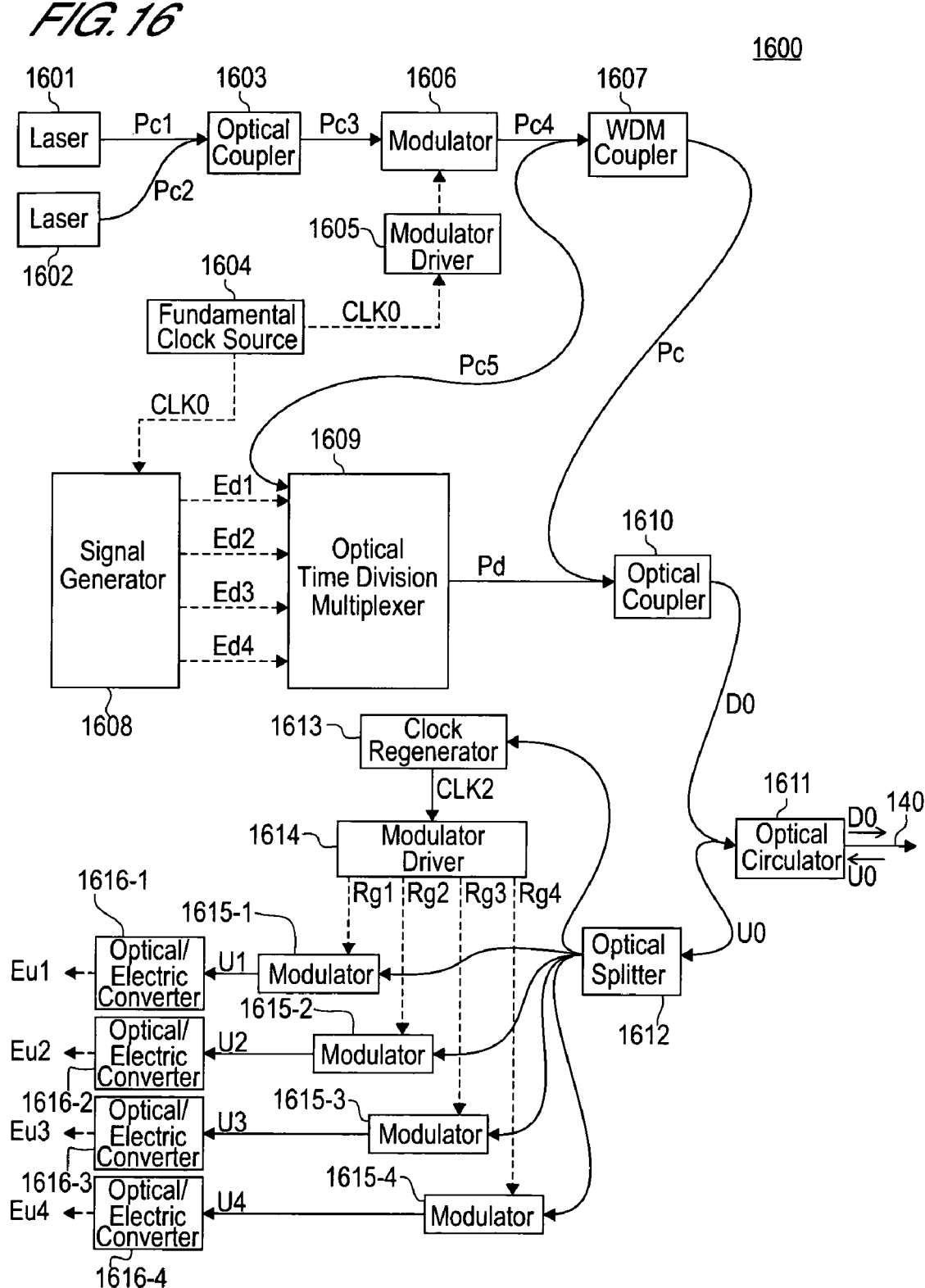
FIG. 16 is a block diagram schematically showing an internal configuration of a network unit according to a fourth embodiment.

FIG. 16 is a block diagram schematically showing the internal configuration of a network unit 1600 according to the present embodiment. In FIG. 16, the components denoted by the same reference numerals as those in FIG. 2 represent the same components in FIG. 2.

As shown in FIG. 16, the network unit 1600 includes lasers 1601 and 1602, an optical coupler 1603, a fundamental clock generator 1604, a modulator driver 1605, a modulator 1606, a WDM coupler 1607, a signal generator 1608, an optical time division multiplexer 1609, an optical coupler 1610, an optical circulator 1611, an optical splitter 1612, a clock regenerator 1613, a modulator driver 1614, modulators 1615-1 to 1615-4, and optical/electric converters 1616-1 to 1616-4.

The laser 1601 outputs a CW light Pc1 of the first wavelength $\lambda 1$.

The laser 1602 outputs a CW light Pc2 of the second wavelength $\lambda 2$.

The optical coupler 1603 couples the CW lights Pc1 and Pc2 input from the lasers 1601 and 1602, respectively, and thereby generates a wavelength-multiplexed CW light Pc3.

The fundamental clock generator 1604 generates a fundamental clock CLK0. The period of the fundamental clock CLK0 is determined in accordance with the period of a downstream signal light Pd to be output from the optical time division multiplexer 1609.

The modulator driver 1605 drives the modulator 1606 according to the fundamental clock CLK0.

The modulator 1606 modulates the wavelength-multiplexed CW light Pc3 based on the drive control by the modulator driver 1606, and thereby generates an optical short pulse train Pc4 having the same period as the fundamental clock CLK0.

The WDM coupler 1607 wavelength-demultiplexes the optical short pulse train Pc4 into an optical short pulse train Pc5 of the first wavelength $\lambda 1$ and an optical short pulse train Pc of the second wavelength $\lambda 2$.

The signal generator 1608 outputs to the optical time division multiplexer 1609 electrical signal trains Ed1 to Ed4 corresponding to downstream transmission signals.

The optical time division multiplexer 1609 generates the downstream signal light Pd using the optical short pulse train Pc5 and the electrical signal trains Ed1 to Ed4 (which will be described later).

The optical coupler 1610 couples the optical short pulse train Pc of the second wavelength $\lambda 2$, i.e., an upstream communication optical carrier, which is output from the WDM coupler 1607, and the downstream signal light Pd of the first wavelength $\lambda 1$ output from the optical time division multiplexer 1609, and thereby generates a downstream wavelength-multiplexed light D0.

The optical circulator 1611 outputs the wavelength-multiplexed light generated by the optical coupler 1610 to the optical fiber 140, and sends to the optical splitter 1612 an upstream signal light U0 input through the optical fiber 140.

The optical slitter 1612 branches the upstream signal light U0 into five lights.

The clock regenerator 1613 accepts as input the upstream signal light U0 and generates an optical clock CLK2 which is synchronized with the upstream signal light U0.

The modulator driver 1614 drives the modulators 1615-1 to 1615-4 individually according to the optical clock CLK2.

The modulators 1615-1 to 1615-4 modulate the respective upstream signal lights U0 based on control by the modulator driver 1614. By this, the upstream signal lights U0 are time-division demultiplexed into signal lights U1 to U4.

The optical/electric converters 1616-1 to 1616-4 convert the signal lights U1 to U4, respectively, into electrical signals and thereby generate electrical signal trains Eu1 to Eu4, respectively.

Now, the operation of the optical communication system according to the present embodiment will be described with reference to FIGS. 17 and 18.

Figure 17:
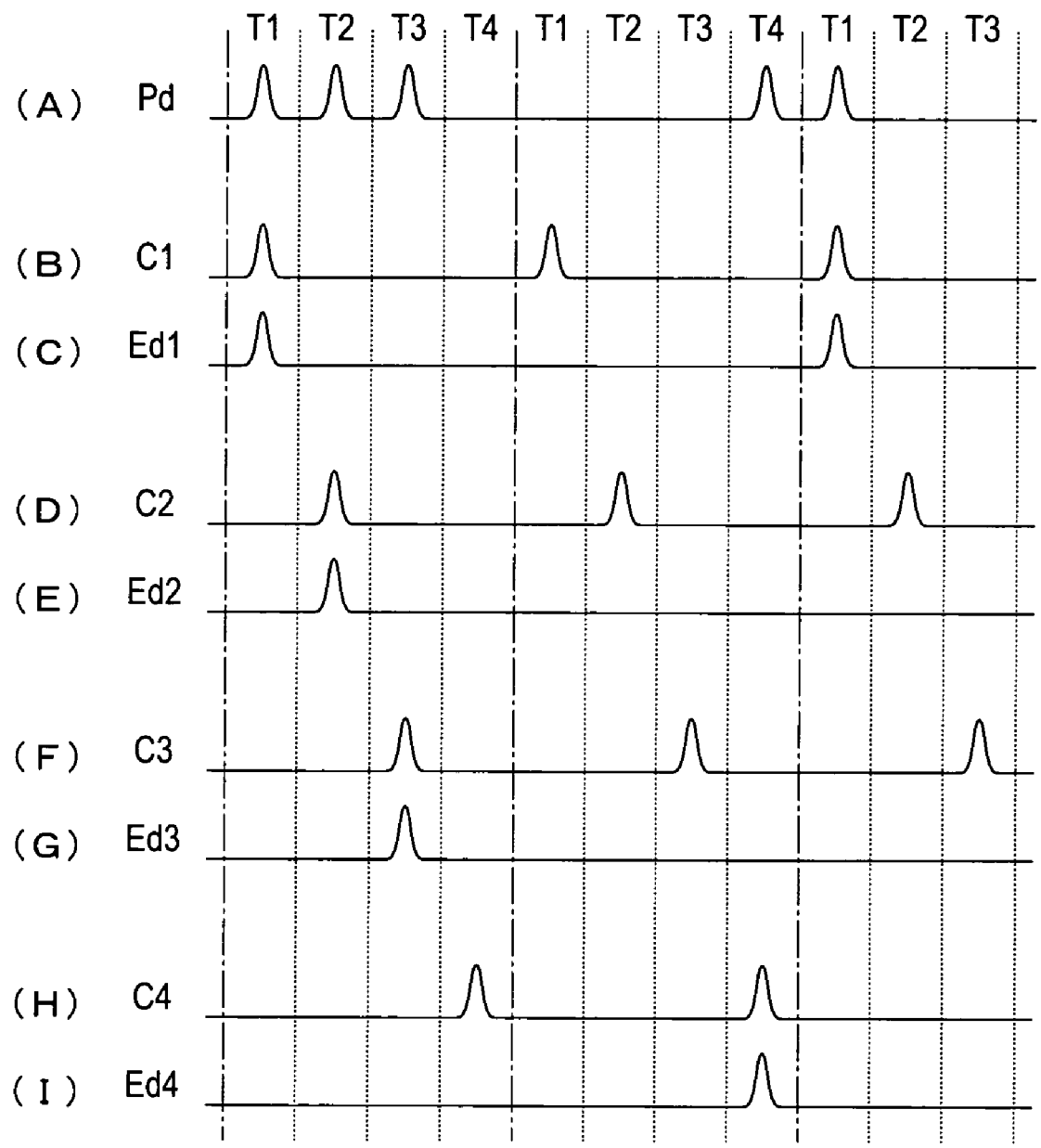
FIG. 17 is a conceptual signal waveform diagram for describing downstream communication in an optical communication system according to the fourth embodiment.

FIG. 17 is a conceptual signal waveform diagram for describing downstream communication in the optical communication system according to the present embodiment.

As described above, the lasers 1601 and 1602 output a CW light Pc1 of the first wavelength $\lambda 1$ and a CW light Pc2 of the second wavelength $\lambda 2$, respectively. The optical coupler 1603 wavelength-multiplexes the CW lights Pc1 and Pc2 and thereby generates a CW light Pc3. The modulator 1606 generates, from the CW light Pc3, an optical short pulse train Pc4 having the same period as a fundamental clock CLK0. The optical short pulse train Pc4 is wavelength-demultiplexed by the WDM coupler 1607 into an optical short pulse train Pc5 of the first wavelength $\lambda 1$ and an optical short pulse train Pc of the second wavelength $\lambda 2$.

The optical time division multiplexer 1609 accepts as input the optical short pulse train Pc5 from the WDM coupler 1607 and branches the optical short pulse train Pc5 into four trains inside thereof. By this, four optical short pulse trains C1 to C4 corresponding to time slots T1 to T4, respectively, are obtained (see (B), (D), (F), and (H) in FIG. 17). Then, the optical time division multiplexer 1609 modulates the branched optical short pulse trains according to the signal values of electrical signal trains Ed1 to Ed4 (see (C), (E), (G) and (I) in FIG. 17). By this, four optical signal trains are generated. Furthermore, the optical time division multiplexer 1609 time-division multiplexes these optical signal trains. By this, a downstream signal light Pd is generated (see (A) in FIG. 17).

The optical coupler 1610 wavelength-multiplexes the optical short pulse train Pc, which serves as an upstream communication optical carrier, and the downstream signal light Pd. A downstream wavelength-multiplexed light D0 thus generated is sent to and the optical multiplexer/demultiplexer 120 (see FIG. 1) through the optical circulator 1611 and the optical fiber 140.

The downstream communication operation of the optical multiplexer/demultiplexer 120 and the terminal units 130-1 to 130-4 is the same as that described in the first embodiment and thus the description thereof is not repeated.

Figure 18:
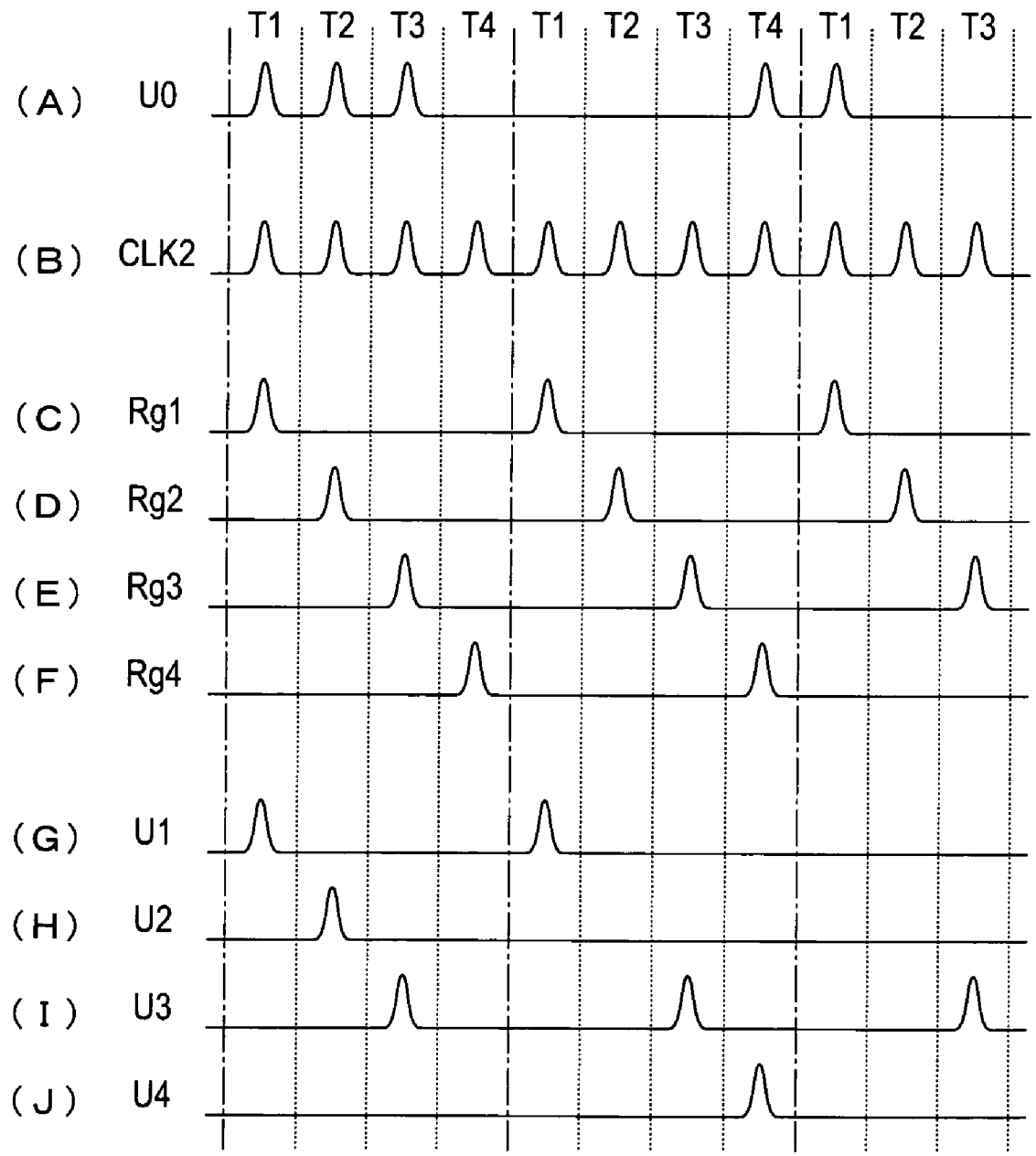
FIG. 18 is a conceptual signal waveform diagram for describing upstream communication in the optical communication system according to the fourth embodiment.

FIG. 18 is a conceptual signal waveform diagram for describing upstream communication in the optical communication system according to the present embodiment.

As in the first embodiment, the terminal units 130-1 to 130-4 (see FIG. 1) generate upstream signal lights U1 to U4, respectively. The optical multiplexer/demultiplexer 120 generates, as in the first embodiment, an upstream signal light U0 and sends the upstream signal light U0 to the network unit according to the present embodiment.

Once the upstream signal light U0 (see (A) in FIG. 18) is received by the network unit, the upstream signal light U0 is sent to the optical splitter 1612 through the optical circulator 1611. The optical splitter 1612 branches the upstream signal light U0 into two lights and sends the lights to the clock regenerator 1613 and the modulators 1615-1 to 1615-4.

The clock regenerator 1613 regenerates a clock CLK2 which is synchronized with the upstream signal light U0 (see (B) in FIG. 18). That is, in the present embodiment, without converting the upstream signal light U0 into an electrical signal train, the upstream signal light U0 is utilized to regenerate the clock CLK2.

The modulator driver 1614 frequency divides the clock CLK2 by four and thereby generates drive signals Rg1 to Rg4 (see (C) to (F) in FIG. 18).

The modulators 1615-1 to 1615-4 modulate the respective upstream signal lights U0 based on the drive signals Rg1 to Rg4. That is, the modulators 1615-1 to 1615-4 operate as gates that extract only components of the time slots T1, T2, T3, and T4, respectively, from the upstream signal lights U0 and allow the components to pass therethrough. By these gates, the upstream signal lights U0 are time-division demultiplexed, whereby signal lights U1 to U4 are regenerated.

Then, by converting the signal lights U1 to U4, respectively, into electrical signals by the optical/electric converters 1616-1 to 1616-4, electrical signal trains Eu1 to Eu4 are obtained ((G) to (J) in FIG. 18).

As described above, in the present embodiment, by time-division multiplexing optical signals an optical signal Pd is generated, and upstream signal lights U0 are time-division demultiplexed and then converted into electrical signals. Thus, according to the present embodiment, a time division multiplexing process and a time division demultiplexing process in the network unit can be performed at high speed.

What is claimed is:

1. An optical communication system comprising:
   a network unit that generates a downstream light wave including a downstream signal light of a first wavelength, and demultiplexes a time-division multiplexed upstream light wave;
   a plurality of terminal units wherein each unit is generating its own second wavelength upstream signal light; and
   an optical multiplexer/demultiplexer that branches the downstream signal light received from the network unit, sends the branched downstream signal lights to the terminal units, regenerates a synchronization clock from the downstream light wave and time-division multiplexes, using the synchronization clock, said upstream signal lights received from the terminal units.

2. The optical communication system according to claim 1, wherein the downstream light wave includes an optical carrier of the second wavelength, and the terminal units each generate the upstream signal light using the optical carrier.

3. The optical communication system according to claim 2, wherein the network unit includes: a time division multiplexer that time-division multiplexes a plurality of electrical signal trains; an electric/optical converter that converts the multiplexed signal generated by the time division multiplexer into an optical signal of the first wavelength; and an optical coupler that wavelength-multiplexes a continuous optical carrier of the second wavelength output from a laser and the optical signal of the first wavelength.

4. The optical communication system according to claim 3, wherein the optical coupler is connected to the laser through an optical isolator.

5. The optical communication system according to claim 3, wherein the optical multiplexer/demultiplexer includes:
   a clock regenerator that regenerates a clock which is synchronized with the downstream signal light;

a modulator driver which generates a plurality of drive signals according to the regenerated signal, the phases of which are shifted from each other by a predetermined period;

a plurality of variable optical delay lines modules each of which delays the upstream signal light received from a corresponding one of the terminal units and outputs the delayed upstream signal light;

a plurality of modulators each of which time-division demultiplexes a branched downstream light wave based on the a corresponding one of the drive signals, and outputs a phase difference signal which indicates the phase difference between a corresponding one of the delayed upstream signal lights input from the corresponding variable optical delay lines module and the corresponding drive signal; and a plurality of variable optical delay lines module drivers each of which adjusts a delay time of a corresponding one of the variable optical delay lines modules by using a corresponding one of the phase difference signals.

6. The optical communication system according to claim 5, wherein:

the phase difference signals are each a composition of the corresponding drive signal and the corresponding delayed upstream signal light; and the variable optical delay lines module drivers each adjust the delay time of the corresponding variable optical delay lines module such that an optical intensity of the corresponding phase difference signal becomes maximum.

7. The optical communication system according to claim 3, wherein the terminal units each include: a coupler that wavelength demultiplexes the downstream light wave into the downstream signal light and the optical carrier; an optical/electric converter that converts the downstream signal light demultiplexed by the coupler into a downstream electrical signal train; a modulator that modulates, according to a drive signal, the optical carrier demultiplexed by the coupler and thereby generates an upstream signal light; and a modulator driver that generates the drive signal based on an upstream electrical signal train.

8. The optical communication system according to claim 2, wherein the network unit includes: a time division multiplexer that time-division multiplexes a plurality of electrical signal trains; an electric/optical converter that converts the multiplexed signal generated by the time division multiplexer into an optical signal of the first wavelength; a modulator that converts a continuous optical carrier of the second wavelength output from a laser into an optical pulse carrier; and an optical coupler that wavelength-multiplexes the optical pulse carrier generated by the modulator and the optical signal of the first wavelength.

9. The optical communication system according to claim 8, wherein the optical coupler is connected to the laser through an optical isolator.

10. The optical communication system according to claim 8, wherein the optical multiplexer/demultiplexer includes:

an optical filter which extracts the optical pulse carrier from the downstream light wave;

a modulator driver which generates a plurality of drive signals according to the optical pulse carrier, the phases of which are shifted from each other by a predetermined period;

a plurality of variable optical delay lines modules each of which delays the upstream signal light received from a corresponding one of the terminal units and outputs the delayed upstream signal light;

a plurality of modulators each of which time-division demultiplexes a branched downstream light wave based on a corresponding one of the drive signals, and outputs a phase difference signal which indicates the phase difference between a corresponding one of the delayed upstream signal lights input from the corresponding variable optical delay lines module and the corresponding drive signal; and a plurality of variable optical delay lines module drivers each of which adjusts a delay time of a corresponding one of the variable optical delay lines modules by using a corresponding one of the phase difference signals.

11. The optical communication system according to claim 9, wherein:

the phase difference signals are each a composition of the corresponding drive signal and the corresponding delayed upstream signal light; and the variable optical delay lines module drivers each adjust the delay time of the corresponding variable optical delay lines module such that an optical intensity of the corresponding phase difference signal becomes maximum.

12. The optical communication system according to claim 2, wherein the network unit includes: an identification information assigner that assigns identification information to a plurality of electrical signal trains formed in packets; a multiplexer that multiplexes the electrical signal trains assigned with the identification information; an electric/optical converter that converts the multiplexed signal generated by the multiplexer into an optical signal of the first wavelength; and an optical coupler that wavelength-multiplexes a continuous optical carrier of the second wavelength output from a laser and the optical signal of the first wavelength.

13. The optical communication system according to claim 12, wherein the optical coupler is connected to the laser through an optical isolator.

14. The optical communication system according to claim 12, wherein the optical multiplexer/demultiplexer includes:

a clock regenerator that regenerates a clock which is synchronized with the downstream signal light;

a plurality of variable optical delay lines modules each of which delays the upstream signal light received from a corresponding one of the terminal units and outputs the delayed upstream signal light;

a plurality of modulators each of which time-division demultiplexes a branched downstream light wave based on a corresponding drive signal which is generated according to the regenerated signal, and outputs a phase difference signal which indicates the phase difference between a corresponding one of the delayed upstream signal lights input from the corresponding variable optical delay lines module and the corresponding drive signal; and a plurality of variable optical delay lines module drivers each of which adjusts a delay time of a corresponding one of the variable optical delay lines modules by using a corresponding one of the phase difference signals; and an optical coupler that time-division multiplexes the branched downstream light waves output from the modulators and outputs time-division multiplexed lights to the terminal units, respectively.

15. The optical communication system according to claim 14, wherein:

the phase difference signals are each a composition of the corresponding drive signal and the corresponding delayed upstream signal light; and the variable optical delay lines module drivers each adjust the delay time of the corresponding variable optical delay lines module such that an optical intensity of the corresponding phase difference signal becomes maximum.

16. The optical communication system according to claim 12, wherein the terminal units each include: a coupler that wavelength demultiplexes the downstream light wave into the downstream signal light and the optical carrier; an optical/electric converter that converts the downstream signal light demultiplexed by the coupler into a downstream electrical signal train; a checker that reads the identification information from the downstream electrical signal train and identifies a destination of the downstream electrical signal train; a modulator that modulates, according to a drive signal, the optical carrier demultiplexed by the coupler and thereby generates an upstream signal light; and a modulator driver that generates the drive signal based on an upstream electrical signal train.

17. The optical communication system according to claim 2, wherein the network unit includes: a first optical coupler that wavelength-multiplexes an optical carrier of the first wavelength and the optical carrier of the second wavelength; a modulator that generates, using a fundamental clock, an optical short pulse train from the wavelength-multiplexed optical carrier output from the first optical coupler; a second optical coupler that wavelength-demultiplexes an optical pulse output from the modulator into an optical short pulse train of the first wavelength and an optical short pulse train of the second wavelength; a transmission signal generator that outputs a plurality of electrical signal trains which are synchronized with the fundamental clock; an optical time division multiplexer that generates the downstream signal light using the electrical signal trains and the optical short pulse train of the first wavelength; and a third optical coupler that wavelength-multiplexes the downstream signal light and the optical short pulse train of the second wavelength.

18. The optical communication system according to claim 2, wherein the network unit includes:
- a clock regenerator that regenerates a clock which is synchronized with the upstream signal light;
- a plurality of modulators which time-division demultiplex the upstream signal light based on the regenerated clock; and
- a plurality of optical/electric converters which convert the signal light demultiplexed by the modulators into an electrical signals.

* * * * *

UNITED STATES PATENT AND TRADEMARK OFFICE
CERTIFICATE OF CORRECTION

PATENT NO. : 7,630,640 B2  Page 1 of 1
APPLICATION NO. : 11/433454
DATED : December 8, 2009
INVENTOR(S) : Kagawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Second Day of November, 2010

David J. Kappos
*Director of the United States Patent and Trademark Office*